(12) United States Patent
Okada et al.

(10) Patent No.: US 10,242,807 B2
(45) Date of Patent: Mar. 26, 2019

(54) LITHIUM ION CAPACITOR

(71) Applicant: Asahi Kasei Kabushiki Kaisha, Tokyo (JP)

(72) Inventors: Nobuhiro Okada, Tokyo (JP); Osamu Saito, Tokyo (JP); Kensuke Niimura, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/762,620

(22) PCT Filed: Jan. 21, 2014

(86) PCT No.: PCT/JP2014/051115
§ 371 (c)(1),
(2) Date: Jul. 22, 2015

(87) PCT Pub. No.: WO2014/115723
PCT Pub. Date: Jul. 31, 2014

(65) Prior Publication Data
US 2015/0371788 A1   Dec. 24, 2015

(30) Foreign Application Priority Data

Jan. 22, 2013  (JP) ................. 2013-009583

(51) Int. Cl.
*H01G 11/06* (2013.01)
*H01G 11/26* (2013.01)
(Continued)

(52) U.S. Cl.
CPC ............ *H01G 11/06* (2013.01); *H01G 11/24* (2013.01); *H01G 11/26* (2013.01); *H01G 11/34* (2013.01);
(Continued)

(58) Field of Classification Search
CPC ........ H01G 11/06; H01G 11/26; H01G 11/34; H01G 11/52
(Continued)

(56) References Cited

U.S. PATENT DOCUMENTS

2005/0208383 A1* 9/2005 Totsuka ................ H01M 2/162
429/247
2010/0276631 A1  11/2010 Mabuchi et al.
(Continued)

FOREIGN PATENT DOCUMENTS

EP       2214236 A1     8/2010
JP       2003-346801 A  12/2003
(Continued)

OTHER PUBLICATIONS

Supplementary European Search Report issued in corresponding European Patent Application No. 14743981.4 dated Jan. 22, 2016.
(Continued)

*Primary Examiner* — Eric Thomas
*Assistant Examiner* — Arun Ramaswamy
(74) *Attorney, Agent, or Firm* — Morgan, Lewis & Bockius LLP

(57) ABSTRACT

Provided is a lithium ion capacitor that is capable, during internal short circuiting, of suppressing an increase in capacitor temperature and controlling the onset of gasification, smoking and ignition, and of having preferably both low resistance (i.e., high output density) and high cycle characteristics. The lithium ion capacitor comprises an electrode laminated body stored in a casing together with a non-aqueous electrolytic solution containing a lithium ion-containing electrolyte; wherein the electrode laminated body is laminated so that a negative electrode collector having a negative electrode active material comprised of a carbon material, and a positive electrode body having a positive
(Continued)

electrode active material face each other through a laminated separator where a polyolefin porous membrane and an insulating porous membrane are laminated; and characterized in that the insulating porous membrane is in contact with the negative electrode body.

16 Claims, 2 Drawing Sheets

(51) Int. Cl.
  *H01G 11/34* (2013.01)
  *H01G 11/52* (2013.01)
  *H01G 11/24* (2013.01)
  *H01M 2/16* (2006.01)

(52) U.S. Cl.
  CPC ............ *H01G 11/52* (2013.01); *H01M 2/166* (2013.01); *H01M 2/1686* (2013.01); *Y02E 60/13* (2013.01); *Y02T 10/7022* (2013.01)

(58) Field of Classification Search
  USPC .......................................... 361/502, 503, 504
  See application file for complete search history.

(56) References Cited

U.S. PATENT DOCUMENTS

| | | |
|---|---|---|
| 2010/0285348 A1 | 11/2010 | Murata et al. |
| 2011/0045338 A1 | 2/2011 | Bae et al. |
| 2011/0143185 A1 | 6/2011 | Nishikawa |
| 2012/0134075 A1* | 5/2012 | Kawai .................... H01G 11/06 361/532 |
| 2012/0328929 A1 | 12/2012 | Matsumoto et al. |
| 2014/0287295 A1 | 9/2014 | Honda et al. |
| 2015/0050545 A1 | 2/2015 | Murata et al. |

FOREIGN PATENT DOCUMENTS

| | | |
|---|---|---|
| JP | 2006-59733 A | 3/2006 |
| JP | 2007-083549 A | 4/2007 |
| JP | 2008-186721 A | 8/2008 |
| JP | 4139960 B2 | 8/2008 |
| JP | 2009-26733 A | 2/2009 |
| JP | 2009-224391 A | 10/2009 |
| JP | 2010-080419 A | 4/2010 |
| JP | 2010-267875 A | 11/2010 |
| JP | 2011-515799 A | 5/2011 |
| JP | 2011-204903 A | 10/2011 |
| JP | 2012-72263 A | 4/2012 |
| JP | 2012-102199 A | 5/2012 |
| JP | 2013-105521 A | 5/2013 |
| KR | 10-2010-0101602 A | 9/2010 |
| KR | 10-2011-0050517 A | 5/2011 |
| TW | 200950182 A1 | 12/2009 |
| TW | 201302617 A1 | 1/2013 |
| WO | 2009/110726 A2 | 9/2009 |
| WO | 2013/147071 A1 | 10/2013 |

OTHER PUBLICATIONS

International Search Report issued in corresponding PCT Application No. PCT/JP2014/051115 dated Mar. 11, 2014.

Written Opinion issued in corresponding PCT Application No. PCT/JP2014/051115 dated Mar. 11, 2014.

Office Action issued in a corresponding Taiwanense Patent Application No. TW 1042090310, dated Jul. 8, 2015.

* cited by examiner

LITHIUM ION CAPACITOR

TECHNICAL FIELD

The present invention relates to a lithium ion capacitor having both high output density and high safety.

BACKGROUND ART

Recently, a nighttime power storage system, a home-use distributed electrical storage system based on photovoltaic power generation technology, and an electrical storage system for an electric vehicle have attracted attention, from the viewpoint of effective utilization of energy aimed at global environmental conservation and effective utilization of resources.

In these electrical storage systems, the first requirement is that an energy density of an electrical storage element used in the systems, is high. As a strong candidate of the electrical storage element having a high degree of energy density and capable of meeting other storage requirements, lithium ion batteries have been actively sought.

The second requirement is the capacitance for high output. For example, in a combination of a highly efficient engine and an electrical storage system (for example, a hybrid electric vehicle), or in combination of a fuel cell and an electrical storage system (for example, a fuel-cell electric vehicle), high output discharge characteristic is required from the electrical storage system, in order to achieve sufficient acceleration.

At present, as one type of a high output electrical storage element, an electric double layer capacitor using activated carbon as an electrode, has been developed, which exhibit high durability (in particular, a cycle characteristic and a high temperature storage characteristic), and output characteristic of about 0.5 to 1 KW/L. These electric double layer capacitors are believed to be the optimum electrical storage element in fields where the above-described high output is required; however, the energy density is only about 1 to 5 Wh/L, and output duration time limits their use in practical applications.

On the other hand, a nickel-hydrogen battery that is currently adopted in the hybrid electric vehicle attains the same level of high output as that of the electric double-layer capacitors, and has an energy density of about 160 Wh/L. However, researches have been energetically sought to further increase the energy density and the output, as well as to further improve stability at high temperature and increase durability.

As with lithium ion batteries, researches continues toward realizing the higher output.

For example, a lithium ion battery has been developed that is capable of providing a high output of over 3 kW/L, at a depth of discharge (i.e., a value indicating a state of charge in terms of percentage) of 50%; however, a lithium ion battery has been actually designed to suppress energy density equal to or less than 100 Wh/L, even though a lithium ion battery is identically characterized by the highest energy density (higher than 100 Wh/L). Durability thereof (in particular, cycle characteristic and high temperature storage characteristic) is inferior compared to that of the electric double layer capacitors. Therefore, the lithium ion battery is usable only in depth of discharge that is a narrower range than between 0 to 100%, in order to have practical durability. Therefore, usable capacitance in practice is reduced, and further research is being carried out to enhance durability.

As anther examples, a microporous membrane made of a polyolefin (for example, polyethylene, etc.), having membrane resistance equal to or less than that of a conventional microporous membrane made of a polyolefin, together with high pore content ratio (it may also be referred to as "high porosity"), i.e., high output characteristic; and a lithium ion secondary battery having the microporous membrane made of the polyolefin (refer to cited document 1 below) are proposed.

As another example, a multilayer porous membrane having a porous layer containing inorganic fillers and a resin binder on at least one-side of a polyolefin porous membrane; and a lithium ion secondary battery using the multilayer porous membrane as a separator are proposed (refer to cited documents 2 and 3 below).

Although practical application of the electrical storage element having high output density, high energy density and durability, as described above, has been required, each of the above-mentioned existing electrical storage elements have merits and demerits. Accordingly, a new electrical storage element satisfying these technological requirements has been required, and as a strong candidate thereof, development of an electrical storage element called a lithium ion capacitor has been active in recent years.

The lithium ion capacitor is one type of the electrical storage elements (i.e., non-aqueous lithium-type electrical storage elements) using a non-aqueous electrolytic solution including a lithium ion-containing electrolyte, and is the electrical storage element carrying out charge/discharge by a non-faradaic reaction based on adsorption-desorption of negative ions similar to that in the electric double layer capacitor, in a positive electrode, and by a faradaic reaction based on intercalation/deintercalation of lithium ions similar to that in the lithium ion battery, in a negative electrode.

As mentioned above, in the electric double layer capacitors that carry out charge/discharge by an non-faradaic reaction in both of the positive electrode and the negative electrode, the output characteristic is superior, but energy density is low. On the other hand, in a lithium ion battery, which is a secondary battery that carries out charge/discharge by a faradaic reaction in both of the positive electrode and the negative electrode, the energy density is superior, but the output characteristic is inferior. A lithium ion capacitor is a novel electrical storage element which can achieve both superior output characteristic and high energy density, by carrying out charge/discharge based on the non-faradaic reaction in the positive electrode and based on the faradaic reaction in the negative electrode.

Applications using the lithium ion capacitor include electricity storage for railways, construction equipment, and automobiles. It is necessary to have superior temperature characteristic, because operating environment is severe in these applications. Specifically, the temperature characteristics mean a high input/output characteristic at low temperature, or a high cycle life characteristic at high temperature.

CITATION LIST

Patent Document

PATENT DOCUMENT 1: JP-A-2012-72263
PATENT DOCUMENT 2: JP-A-2009-26733
PATENT DOCUMENT 3: WO2013/147071

SUMMARY OF INVENTION

Technical Problem

In a lithium ion battery, a microporous membrane made of a polyolefin is used as a separator whose function is to suppress further progress of an electrochemical reaction by clogging pores (shut down) when a temperature almost a melting point of the microporous membrane, caused by runaway of the electrochemical reaction occurring in the battery. However, it has been difficult to prevent a short circuit of the negative electrode body and the positive electrode body of the battery caused by melt deformation (melt down) of the microporous membrane, under an environment where further high temperature cannot be suppressed, although the electrochemical reaction has been shut down, such as in the case where the battery is immersed in high temperature oil.

In contrast to this, it is believed that it is not necessary to prevent runaway of the electrochemical reaction by shut down function of a microporous membrane made of a polyolefin, even when the electrochemical reaction runs away, because the lithium ion capacitor has a lower energy density compared with the lithium ion battery, and thus a paper separator has mainly been used, which does not melt down at a higher temperature.

However, the present inventors have found possibilities of rupture or unsealing, a large amount of gasification or smoking, depending on conditions, even in the lithium ion capacitor. It is believed that such necessity is attractive as the higher output of the lithium ion capacitor progresses.

For example, when the polyolefin micro porous membrane described in cited document 1 is used as a separator of the lithium ion capacitor, the lithium ion capacitor is unsealed with a large quantity of gasification and smoking, because of sharp temperature rise at the time of internal short circuiting, even if this polyolefin membrane has low resistance.

The use of the multilayer porous membrane described in cited documents 2 and 3, as a separator of the lithium ion capacitor, in a similar structure in the case of a lithium ion secondary battery, has significant influences on the suppression effect of gasification and smoking at the time of internal short circuiting, and various types of characteristics such as output density and the cycle characteristic of the lithium ion capacitor, depending on the selection of an electrode type facing to a porous layer containing inorganic fillers and a resin binder, or selection of a type of the polyolefin micro porous membrane, therefore satisfaction of both of them cannot be easily attained.

Under such circumstances, a problem to be solved by the present invention is to provide a lithium ion capacitor having optimally all of the high output density, high safety and the high cycle characteristic, and in more detail, to provide a lithium ion capacitor which is capable of suppressing rise in capacitor temperature and controlling gasification, smoking and ignition, at the time of internal short circuiting, and of having optimally both of the low resistance (i.e., the high output density) and the high cycle characteristic.

Solution to Problem

The present inventors have intensively studied how to solve the above-described problems and repeated trial and error, and as a result, have discovered that, optimally all of the high output density, highly safe and the high cycle characteristic of the lithium ion capacitor can be exerted, by a lithium ion capacitor having a laminated separator laminated a polyolefin porous membrane and an insulating porous membrane, where the insulating porous membrane is laminated so as to be in contact with a negative electrode body. That is, the present invention is as follows.

[1] A lithium ion capacitor comprising an electrode laminated body stored in a casing together with a non-aqueous electrolytic solution containing a lithium ion-containing electrolyte; wherein
the electrode laminated body is laminated so that a negative electrode body having a negative electrode active material comprised of a carbon material, and a positive electrode body having a positive electrode active material face each other, through a laminated separator where a polyolefin porous membrane and an insulating porous membrane are laminated; and
characterized in that the insulating porous membrane is in contact with the negative electrode body.

[2] The lithium ion capacitor according to the [1], wherein the insulating porous membrane contains inorganic fillers and a resin binder.

[3] The lithium ion capacitor according to the [1] or [2], wherein the thickness of the polyolefin porous membrane of the laminated separator is 5 µm to 35 µm (inclusive), and a thickness ratio of the insulating porous membrane relative to the polyolefin porous membrane (thickness of insulating porous membrane/thickness of polyolefin porous membrane) is 0.25 to 1.00.

[4] The lithium ion capacitor according to any one of the [1] to [3], wherein a pore size of the polyolefin porous membrane is 0.01 µm to 0.1 µm, and a number of pores of the polyolefin porous membrane is 100 pores/µm$^2$ to 250 pores/µm$^2$.

[5] The lithium ion capacitor according to any one of the [1] to [4], wherein a porosity of the polyolefin porous membrane is 50% to 75%.

[6] The lithium ion capacitor according to any one of the [1] to [5], wherein the polyolefin porous membrane is comprised of polyethylene.

[7] The lithium ion capacitor according to any one of the [1] to [6], wherein Brugmann index of the separator is 2.5 to 3.5, which is measured and calculated using methyl ethyl carbonate as a probe molecule.

[8] The lithium ion capacitor according to any one of the [1] to [7], wherein static capacitance is 100 F or higher.

[9] The lithium ion capacitor according to any one of the [1] to [8], wherein the negative electrode active material is a composite porous material formed by depositing pitch coal to the surface of an activated carbon.

[10] The lithium ion capacitor according to the [9], wherein the composite porous material satisfies, at the same time, in the initial time lithium charge/discharge characteristic, the following:
 1) a charging amount is 1100 mAh/g to 2000 mAh/g (inclusive); and
 2) a discharging amount is 100 mAh/g or higher, under a negative electrode potential of 0 to 0.5 V.

[11] The lithium ion capacitor according to any one of the [1] to [10], wherein the positive electrode active material is an activated carbon.

[12] The lithium ion capacitor according to the [11], wherein the activated carbon has a BET specific surface area of 2600 m$^2$/g to 4500 m$^2$/g (inclusive), mesopore volume V1 (cc/g) is 0.8<V1≤2.5, which is derived from pores having a size of 20 Å to 500 Å (inclusive), calculated by the BJH method, micro-pore volume V2 (cc/g) is 0.92<V2≤3.0, which is derived from pores having a size of smaller than 20 Å, calculated by the MP method, and an average particle size is 1 μm to 30 μm (inclusive), and the positive electrode active material layer has a bulk density of 0.40 g/cm³ to 0.70 g/cm³ (inclusive).

Advantageous Effects of Invention

The lithium ion capacitor of the present invention is capable of exerting optimally all of the high output density, the high cycle characteristic and high safety of the lithium ion capacitor, by the lithium ion capacitor in which the insulating porous membrane is laminated to, so as to be in contact with the negative electrode body, in the laminated separator where the polyolefin porous membrane and the insulating porous membrane are laminated, i.e.,
it is capable of securing optimally all of suppressing rise in capacitor temperature of the lithium ion capacitor, controlling gasification, smoking and ignition, and high safety of the lithium ion capacitor, at the time of internal short circuiting.

DESCRIPTION OF EMBODIMENTS

Figure 1:
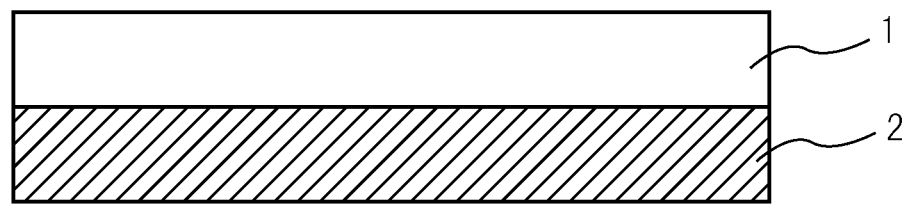
FIG. 1 is a schematic cross-sectional view of a separator in the embodiment of the present invention.

Explanation on the embodiment of the present invention will be given below in detail.
In general, the lithium ion capacitor (hereafter it may also be referred to as "capacitor") has a positive electrode body, a separator, a negative electrode body, an electrolytic solution and a casing, as main constitutional elements. In the embodiment of the present invention, the separator comprising a polyolefin porous membrane and an insulating porous membrane formed to the one-side of the polyolefin porous membrane, is used. Explanation on each constitutional element will be given below in detail.
<Negative Electrode>
The negative electrode body used in the capacitor of the present invention is the one where a negative electrode active material layer is laid on a negative electrode collector. The negative electrode collector is preferably a metal foil, and more preferably a copper foil having a thickness of 1 to 100 μm.
The negative electrode active material layer contains the negative electrode active material and a binding agent, as well as conductive fillers, as needed. The negative electrode active material is a carbon material which is capable of intercalating and deintercalating lithium ions. The negative electrode active material can contain other materials, which intercalate and deintercalate lithium ions, such as a lithium-titanium composite oxide or an electric conductive polymer, in addition to this carbon material. The carbon material, for example, can include hard carbon, soft carbon, or a composite porous material.
<Negative Electrode 1>
It is preferable that the negative electrode active material is a composite porous material obtained by depositing the carbon material to the surface of the activated carbon. The above-described composite porous material can be obtained, for example, by heat treating the activated carbon and a carbon material precursor in a state that they are co-present.
With respect to the activated carbon used as a raw material of the above-described composite porous material, the raw material to obtain the activated carbon is not particularly limited, as long as the resulting composite porous material exerts the desired characteristics, and a commercial product obtained from various raw materials, such as those derived from a petroleum-based, a coal-based, a plant-based, and a polymer-based activated carbons can be used. In particular, it is preferable to use activated carbon powder having an average particle size of 1 μm to 15 μm (inclusive). The average particle size is more preferably 2 μm to 10 μm (inclusive). The average particle size in the present description indicates a 50% diameter (Median diameter) which is a particle size at which an accumulated curve thereof is 50% in determining the accumulated curve, assuming the total volume as 100%, in measuring the particle size distribution using a particle size distribution measuring apparatus. This average particle size can be measured using a commercial laser diffraction-type particle size distribution measuring apparatus.
On the other hand, the carbon material precursors used as the raw materials of the composite porous material is solid, liquid, or an organic material soluble in a solvent and capable of depositing the carbon material onto the activated carbon by heat treatment, and can include, for example, pitch, mesocarbon microbeads, coke, or a synthetic resin such as a phenolic resin. Among these carbon material precursors, it is preferable to use pitch which is low in price from the viewpoint of production cost. Pitch can be roughly classified into petroleum pitch and coal pitch. For example, as the petroleum pitch, there is exemplified, a distillation residue of crude oil, a fluidized catalytic cracking residue (decant oil, etc.), bottom oil derived from thermal cracker, or ethylene tar obtained in naphtha cracking.
In the case of using the above-described pitch, the composite porous material is obtained by depositing the carbon material onto the activated carbon by subjecting volatile components or thermally decomposed components of the pitch to thermal reaction at the surface of the activated carbon. In this case, deposition of the volatile components or the thermally decomposed components of the pitch to the inside of pores of the activated carbon proceeds at a temperature of about 200 to 500° C., and a conversion reaction of the deposited components to the carbon material proceeds at a temperature of 400° C. or higher. Peak temperature in the heat treatment is determined as appropriate, by characteristics of the resulting composite porous material, a thermal reaction pattern, or thermal reaction atmosphere. It is preferably 400° C. or higher, more preferably about 450° C. to 1000° C., and still more preferably about 500 to 800° C. Time for maintaining the peak temperature in the heat treatment may be enough for 30 minutes to 10 hours, and is preferably 1 to 7 hours, and more preferably 2 to 5 hours. For example, in the case where the heat treatment is carried out at the peak temperature of about 500 to 800° C. for 2 hours to 5 hours, it is believed that the carbon material deposited to the surface of the activated carbon is converted to a polycyclic aromatic hydrocarbon.
A production method for the above-described composite porous material includes, for example, a method for heat treating the activated carbon in inert gas atmosphere containing hydrocarbon gas volatilized from the carbon material precursor to deposit the carbon material in a vapor phase. A method for mixing the activated carbon and the carbon material precursor in advance and carrying out the heat treatment; or a method for coating the carbon material precursor dissolved in a solvent, onto the activated carbon, then drying it, and carrying out the heat treatment, is also possible.

The composite porous material is the material where the carbon material is deposited to the surface of the activated carbon, and pore distribution thereof after the carbon material is deposited inside the pores of the activated carbon is important. The pore distribution is specified by a mesopore volume and a micro-pore volume. In the present invention, in particular, a ratio of mesopore volume/micro-pore volume is important, together with absolute value of the mesopore volume and the micro-pore volume. That is, in one aspect of the present invention, it is preferable that $0.010 \leq Vm1 \leq 0.250$, $0.001 \leq Vm2 \leq 0.200$ and $1.5 \leq Vm1/Vm2 \leq 20.0$, provided that the mesopore volume derived from pores having a diameter of 20 Å to 500 Å (inclusive), calculated by the BJH method, is $Vm1$ (cc/g), and the micro-pore volume derived from pores having a diameter of smaller than 20 Å, calculated by the MP method, is $Vm2$ (cc/g), in the above-described composite porous material.

As for the mesopore volume $Vm1$, $0.010 \leq Vm1 \leq 0.225$ is more preferable, and $0.010 \leq Vm1 \leq 0.200$ is still more preferable. As for the micro-pore volume $Vm2$, $0.001 \leq Vm2 \leq 0.150$ is more preferable, and $0.001 \leq Vm2 \leq 0.100$ is still more preferable. As for the ratio of mesopore volume/micro-pore volume, $1.5 \leq Vm1/Vm2 \leq 15.0$ is more preferable, and $1.5 \leq Vm1/Vm2 \leq 10.0$ is still more preferable. At the mesopore volume $Vm1$ of the upper limit or less ($Vm1 \leq 0.250$), high charge/discharge efficiency to lithium ions can be maintained, and at the mesopore volume $Vm1$ and the micro-pore volume $Vm2$ of the lower limit or more ($0.010 \leq Vm1$, $0.001 \leq Vm2$), high output characteristic is maintained.

It is believed that the mesopore volume is necessary to obtain high output characteristic, because, in the mesopore having large pore size, ion conductivity is higher as compared with the micro-pore, and on the other hand, it is necessary to control the micro-pore volume to obtain high durability, because of difficulty in desorption of impurities, such as moisture, which are said to affect adversely on durability of the electrical storage element, in the micro-pore having small pore size. Therefore, control of the ratio of the mesopore volume and the micro-pore volume is important, and in the case where the ratio is the lower limit or more ($1.5 \leq Vm1/Vm2$), i.e., in the case where the carbon material deposits more on the micro-pore than on the mesopore of the activated carbon, and the mesopore volume of the composite porous material after the deposition is more and the micro-pore volume is less, the high energy density, the high output characteristic and high durability (the cycle characteristic, a float characteristic, etc.) are obtained. At the ratio of the mesopore volume and the micro-pore volume of the upper limit or less ($Vm1/Vm2 \leq 20.0$), high output characteristic is obtained.

In the present invention, the micro-pore volume and the mesopore volume are values determined by the following methods. A sample is dried under vacuum at 500° C. for a whole day and night to carry out measurement of an isotherm of absorption and desorption, using nitrogen as an adsorbate. Using the isotherm at the desorption side in this case, the micro-pore volume and the mesopore volume are calculated by the MP method and the BJH method, respectively.

The MP method means a method for determining the micro-pore volume, the micro-pore area and the micro-pore distribution, by utilization of a "t-plot method" (B. C. Lippens, J. H. de Boer, J. Catalysis, 4319 (1965)), which is a method devised by M. Mikhail, Brunauer, and Bodor (R. S. Mikhail, S. Brunauer, E. E. Bodor, J. Colloid Interface Sci., 26, 45 (1968)). The BJH method is a calculation method used generally in analysis of the mesopore, which was proposed by Barrett, Joyner, Halenda et. al. (E. P. Barrett, L. G. Joyner and P. Halenda, J. Amer. Chem. Soc., 73, 373(1951)).

In the embodiment of the present invention, as mentioned above, the ratio of mesopore volume/micro-pore volume after the deposition of the carbon material to the surface of the activated carbon, is important. In order to obtain the composite porous material having a pore distribution range specified by the present invention, pore distribution of the activated carbon used as a raw material is important.

In the activated carbon used in formation of the composite porous material as the negative electrode active material, it is preferable that $0.050 \leq V1 \leq 0.500$, $0.005 \leq V2 \leq 1000$ and $0.2 \leq V1/V2 \leq 20.0$, provided that the mesopore volume derived from pores having a diameter of 20 Å to 500 Å (inclusive), calculated by the BJH method, is $V1$ (cc/g), and the micro-pore volume derived from pores having a diameter of smaller than 20 Å, calculated by the MP method, is $V2$ (cc/g).

As for the mesopore volume $V1$, $0.050 \leq V1 \leq 0.350$ is more preferable, and $0.100 \leq V1 \leq 0.300$ is still more preferable. As for the micro-pore volume $V2$, $0.005 \leq V2 \leq 0.850$ is more preferable, and $0.100 \leq V2 \leq 0.800$ is still more preferable. As for the ratio of mesopore volume/micro-pore volume, $0.22 \leq V1/V2 \leq 15.0$ is more preferable, and $0.25 V1/V2 \leq 10.0$ is still more preferable. In the case where the mesopore volume $V1$ of the activated carbon is 0.500 or less, and in the case where the micro-pore volume $V2$ is 1.000 or less, control of a pore structure tends to be easy, because it is enough to make suitable amount of the carbon material deposited, in order to obtain the pore structure of the composite porous material of one aspect of the above-described present invention. On the other hand, at the mesopore volume $V1$ of the activated carbon of 0.05 or more, and at the micro-pore volume $V2$ thereof of 0.005 or more, as well as at $V1/V2$ of 0.2 or more, and at $V1/V2$ is 20.0 or less, the pore structure of the composite porous material of one aspect of the above-described present invention tends to be obtained easily, from pore distribution of the activated carbon.

Average particle size of the composite porous material in the present invention is preferably 1 μm to 10 μm (inclusive). The lower limit is more preferably 2 μm or more, and still more preferably 2.5 μm or more. The upper limit is more preferably 6 μm or less, and still more preferably 4 μm or less. At the average particle size of 1 μm to 10 μm (inclusive), good durability is maintained. A measuring method for the average particle size of the above-described composite porous material is the same as the measuring method used for average particle size of the activated carbon of the above-mentioned positive electrode active material.

Atomic ratio of hydrogen atom/carbon atom (hereafter it may also be referred to as H/C), in the above-described composite porous material, is preferably 0.05 to 0.35 (inclusive), and more preferably 0.05 to 0.15 (inclusive). The H/C of 0.35 or less is preferable, from the viewpoint of enhancing capacitance (energy density) and charge/discharge efficiency, because the structure (typically, a polycyclic aromatic conjugated structure) of the carbon material deposited to the surface of the activated carbon develops sufficiently. On the other hand, at the H/C of 0.05 or more, sufficient energy density is obtained, because carbonization never proceeds excessively. The H/C is measured by an element analysis apparatus.

The above-described composite porous material usually has an amorphous structure derived from a raw material activated carbon, as well as a crystal structure derived from mainly a carbon material deposited. According to a wide-angle X-ray diffraction method, a structure having low crystallinity is preferable in order to exert high output characteristic, and a structure having high crystallinity is preferable in order to maintain reversibility in charge/discharge. From this viewpoint, the composite porous material having a spacing $d_{002}$ of the (002) plane of 3.60 Å to 4.00 Å (inclusive), and crystallite size Lc of 8.0 Å to 20.0 Å (inclusive) in a c-axis direction, obtained from half peak width of this peak, is preferable, and the material having the $d_{002}$ of 3.60 Å to 3.75 Å (inclusive), and crystallite size Lc of 11.0 Å to 16.0 Å (inclusive) in a c-axis direction, obtained from half peak width of this peak, is more preferable.

As a binding agent, for example, polyvinylidene fluoride (PVdF), polytetrafluoroethylene (PTFE), fluororubber, or a styrene-butadiene copolymer can be used. The mixing amount of the binding agent in the negative electrode active material layer is preferably 3 to 20% by mass, and still more preferably in a range of 5 to 15% by mass to the negative electrode active material.

Into the above-described negative electrode active material layer, conductive fillers composed of a carbonaceous material having higher electric conductivity as compared with the negative electrode active material, can be mixed, as needed, other than the above-described carbon material capable of intercalating lithium ions, and the binding agent. The conductive fillers include acetylene black, Ketjen black, vapor phase grown carbon fiber, and a mixture thereof.

A mixing amount of the conductive fillers is preferably 0 to 20% by mass, and still more preferably in a range of 1 to 15% by mass, to the negative electrode active material. It is preferable that the conductive fillers are mixed from the viewpoint of high input, however, when the mixing amount is more than 20% by mass, energy density per volume decreases, because content of the negative electrode active material in the negative electrode active material layer decreases, and thus not preferable.

The negative electrode body is obtained, by preparing paste in which a carbon material capable of intercalating lithium ions and a binding agent (and conductive fillers, as needed) are dispersed in a solvent, and coating this paste onto the negative electrode collector, drying and pressing, as needed. As the coating method, a similar method for the positive electrode body can be used, and the coating method can be selected as appropriate, depending on property of the paste and coating thickness. Thickness of the above-described negative electrode active material layer is usually about 50 to 200 μm.

Into the negative electrode active material used in the capacitor of the present invention, lithium can be doped in advance. By doping lithium in advance, it is possible to control the initial efficiency, capacitance, and output characteristic of the capacitor. The doping amount is in a range of 30 to 100%, and more preferably in a range of 40 to 80% of lithium ions in which the negative electrode active material can intercalate.

A method for doping the lithium ions to the negative electrode active material in advance is not particularly limited in the present invention, and a known method can be used. For example, there is included a method for forming the negative electrode active material to the electrode, and then using the negative electrode body as a working electrode, and metal lithium as a counter electrode, and preparing an electrochemical cell combining a non-aqueous electrolytic solution, and doping lithium ions electrochemically. It is also possible to dope lithium ions to the negative electrode active material, by crimping a metal lithium foil to the negative electrode body and putting it into the non-aqueous electrolytic solution.

<Negative Electrode 2>

The negative electrode active material in the present invention is contained in the negative electrode active material layer, and is characterized by satisfying following 1) and 2) at the same time:

in a three electrode-type cell, where a working electrode is a negative electrode, a counter electrode is lithium, a reference electrode is lithium, and an electrolytic solution is the solution dissolved with $LiPF_6$ so as to attain 1 mol/L in a mixed solvent of ethylene carbonate and methyl ethyl carbonate, in a volume ratio of 1:4;

when an initial time lithium charging amount is defined by charging amount after 40 hours in total in constant current and constant voltage charging, by charging lithium at constant current, under a condition of a current value to attain a value of 100 mA/g per the negative electrode active material, and a cell temperature of 45° C., and still more charging by switching to constant voltage, when a negative electrode potential reaches 1 mV; and an initial time lithium discharging amount is defined by discharging amount in discharging lithium till the negative electrode potential reaches to 2.5 V at constant current, under the conditions that current value to attain a value of 50 mA/g per the negative electrode active material, and a cell temperature is 45° C., after the above-described charging; with respect to the initial time lithium charge/discharge characteristic, 1) a charging amount is 1100 mAh/g to 2000 mAh/g (inclusive); and 2) a discharging amount is 100 mAh/g or higher under a negative electrode potential of 0 to 0.5 V.

As for 1), at the charging amount of 1100 mAh/g or higher, the amount of the negative electrode active material within the negative electrode can be lowered, and it is possible to make the negative electrode active material layer thin, and the electrical storage element is capable of exerting high energy density; while at the charging amount of 2000 mAh/g or lower, pore volume of the negative electrode active material is not excessive, and the bulk density of the negative electrode active material layer can be increased. From the above viewpoints, the charging amount is preferably 1200 mAh/g to 1700 mAh/g (inclusive), and the charging amount is still more preferably 1300 mAh/g to 1600 mAh/g (inclusive).

As for 2), in the case where the negative electrode potential is between 0 and 0.5 V, at the discharging amount of 100 mAh/g or higher, the electrical storage element can be operated at low negative electrode potential in charge/discharge process thereof, and thus high durability can be exerted. From the above viewpoints, the discharging amount is preferably 120 mAh/g or higher, and still more preferably 140 mAh/g or higher, in the case where the negative electrode potential is between 0 and 0.5 V.

It is preferable that the negative electrode active material in the present invention contains the composite porous material where a pitch coal is allowed to deposit to the surface of an activated carbon.

The negative electrode active material containing the composite porous material of the present invention is characterized by satisfying following i) and ii) at the same time:

i) a weight ratio of the pitch coal to the activated carbon is 10% to 60% (inclusive), and a softening point of a pitch, which is a raw material of the pitch coal, is 100° C. or lower; and ii) the negative electrode active material has a BET specific surface area of 350 $m^2/g$ to 1500 $m^2/g$, and lithium ions are doped in an amount of 1100 mAh/g to 2000 mAh/g per unit weight.

Explanation on i) will be given below.

At the weight ratio of the pitch coal to the activated carbon of 10% or higher, micropores of the activated carbon can be suitably filled with the pitch coal, and durability is not impaired due to enhanced charge/discharge efficiency of lithium ions. At the weight ratio of the carbonaceous material is 60% or lower, specific surface area can be increased by suitably maintaining pores of the composite porous material, and pre-doping amount of lithium ions can be increased, and as a result, the high output density and high durability can be maintained, even when a negative electrode is made as a thin membrane. From the above viewpoints, this weight ratio is preferably 15% to 55%, more preferably 18% to 50% (inclusive), and particularly preferably 20% to 47% (inclusive).

At the softening point of the pitch, which is a raw material of the pitch coal, of 100° C. or lower, although not being constrained to theory, micropores of the activated carbon can be suitably filled with the pitch coal, and discharging amount can be increased and durability can be enhanced, when the negative electrode potential is between 0 to 0.5 V, by enhancing charge/discharge efficiency of the initial time lithium charge/discharge characteristic. From the above viewpoints, the softening point of the pitch is preferably 90° C. or lower, and still more preferably 50° C. or lower. It is preferable that the softening point of the pitch is about 35° C. or higher.

Explanation on ii) will be given below.

At the specific surface area of the negative electrode active material, in the BET method, of 350 $m^2/g$ or larger, pores of the negative electrode active material can be suitably maintained, and doping amount of lithium ions can be increased, and as a result, it is possible to make the negative electrode a thin membrane. On the other hand, at this specific surface area of 1500 $m^2/g$ or smaller, the micropores of the activated carbon can be suitably filled, and by enhancing charge/discharge efficiency of the initial time lithium charge/discharge characteristic, discharging amount can be increased, and durability can be enhanced, when the negative electrode potential is between 0 and 0.5 V. From the above viewpoints, this specific surface area is preferably 350 $m^2/g$ to 1100 $m^2/g$, and still more preferably 370 $m^2/g$ to 600 $m^2/g$.

Lithium ions are further doped to the negative electrode active material (it may also be referred to as pre-doping). This pre-doping amount is 1100 mAh/g to 2000 mAh/g (inclusive) per unit weight of the composite porous material. This pre-doping amount is preferably 1200 mAh/g to 1700 mAh/g (inclusive), and still more preferably 1300 mAh/g to 1600 mAh/g (inclusive). Pre-doping of lithium ions decreases the negative electrode potential, and increases cell voltage in combination with a positive electrode, as well as increases utilization capacitance of the positive electrode, and thus provides high capacitance, and high energy density can be obtained.

In the negative electrode for the non-aqueous lithium type electrical storage element of the present invention, at the pre-doping amount of 1100 mAh/g or more, lithium ions are sufficiently pre-doped even at an irreversible site in the negative electrode material, where lithium ions once inserted cannot be desorbed, and furthermore, the amount of the negative electrode active material to the desired lithium amount can be decreased, therefore thickness of the negative electrode membrane can be made thin, and as a result, high durability, output characteristic and the high energy density can be obtained. The higher pre-doping amount decreases the negative electrode potential the more, and enhances durability and the energy density. When it is 2000 mAh/g or lower, there is less risk of generating side-reactions, like deposition of lithium metal.

The above-described negative electrode active material may be used alone, or two or more types may be used in combination.

The composite porous material can be obtained, for example, by heat treatment of an activated carbon and a pitch in a state that they coexist.

As for the activated carbon used as a raw material of the above-described composite porous material, the raw material before converting to the activated carbon is not particularly limited, as long as the resulting composite porous material exerts desired characteristics, and a commercial product obtained from various raw materials, such as a petroleum-type, a coal-type, a plant-type, or a polymer-type, can be used. It is preferable to use activated carbon powder having an average particle size of 1 μm to 15 μm (inclusive). More preferably, the average particle size is 2 μm to 10 μm (inclusive).

On the other hand, the pitch used as a raw material of the above-described composite porous material is largely classified to a petroleum-type pitch and a coal-type pitch. As the petroleum-type pitch, distillation residue of crude oil, fluidic catalytic cracking residue (decant oil, etc.), bottom oil from a thermal cracker, and ethylene tar obtained in naphtha cracking are exemplified.

The composite porous material is obtained by depositing the pitch coal onto the activated carbon by subjecting volatile components or thermally decomposed components of the pitch to a thermal reaction at the surface of the activated carbon. In this case, deposition of the volatile components or thermally decomposed components of the pitch to the inside of pores of the activated carbon proceeds at a temperature of about 200 to 500° C., and the conversion reaction of the deposited components to the pitch coal proceeds at a temperature of 400° C. or higher. Peak temperature in the heat treatment is determined as appropriate, by characteristics of the resulting composite porous material, a thermal reaction pattern, or thermal reaction atmosphere, however, it is preferably 400° C. or higher, more preferably 450° C. to 1000° C., and still more preferably about 500 to 800° C. Time for maintaining peak temperature in the heat treatment may be enough for 30 minutes to 10 hours, and is preferably 1 to 7 hours, and more preferably 2 to 5 hours. In the case where the heat treatment is carried out at the peak temperature of about 500 to 800° C. for 2 hours to 5 hours, it is believed that the pitch coal depositing on the surface of the activated carbon is converted to a polycyclic aromatic hydrocarbon.

A production method for the above-described composite porous material includes, for example, a method for heat treating the activated carbon in inert gas atmosphere containing hydrocarbon gas volatilized from the pitch, and depositing the pitch coal in a vapor phase. A method for mixing the activated carbon and the pitch in advance and carrying out the heat treatment; or a method for coating the pitch dissolved in a solvent onto the activated carbon, followed by drying it, and then carrying out the heat treatment, is also utilizable.

The composite porous material is the material where the pitch coal is deposited to the surface of the activated carbon, and the pore distribution after the pitch is deposited inside pores of the activated carbon is important, and it is specified by the mesopore volume and the micro-pore volume. That is, it is preferable that the composite porous material satisfies at least one of following I) to III):

I) $0.010 \leq Vm1 \leq 0.300$, and $0.010 \leq Vm2 \leq 0.200$;
II) $0.010 \leq Vm1 \leq 0.200$, and $0.200 \leq Vm2 \leq 0.400$; and
III) $0.010 \leq Vm1 \leq 0.100$, and $0.400 \leq Vm2 \leq 0.650$;

provided that Vm1 (cc/g) is the mesopore volume derived from pores having a size of 20 Å to 500 Å (inclusive), calculated by the BJH method, and Vm2 (cc/g) is the micropore volume derived from pores having a size of smaller than 20 Å, calculated by the MP method.

At the mesopore volume Vm1 of the upper limit value or lower ($Vm1 \leq 0.300$), the specific surface area of the composite porous material can be increased, and pre-doping amount of lithium ions can be increased, as well as the bulk density of the negative electrode can be increased. As a result, the negative electrode can be made a thin membrane. At the micropore volume Vm2 of the upper limit value or lower ($Vm1 \leq 0.650$), high charge/discharge efficiency to lithium ions can be maintained. On the other hand, at the mesopore volume Vm1 and the micro-pore volume Vm2 of the lower limit value or higher ($0.010 \leq Vm1$, $0.010 \leq Vm2$), high output characteristic can be obtained.

It is preferable that above-described I) or II) is satisfied among above-described I) to III). In above-described I), it is preferable that the mesopore volume Vm1 is $0.050 \leq Vm1 \leq 0.300$.

In the present invention, as mentioned above, the mesopore volume and the micropore volume after depositing the pitch coal to the surface of the activated carbon are important, and a pore distribution of the activated carbon used as a raw material is important to obtain the composite porous material with the pore distribution range specified in the present invention.

It is preferable that the above-described activated carbon has $0.050 \leq V1 \leq 0.500$, $0.005 \leq V2 \leq 1.000$, and $0.2 \leq V1/V2 \leq 20.0$, provided that V1 (cc/g) is the mesopore volume derived from pores having a size of 20 Å to 500 Å (inclusive), calculated by the BJH method, and V2 (cc/g) is the micro-pore volume derived from pores having a size of smaller than 20 Å, calculated by the MP method.

As for the mesopore volume, $0.050 \leq V1 \leq 0.350$ is more preferable, and $0.100 \leq V1 \leq 0.300$ is still more preferable. As for the micro-pore volume, $0.005 \leq V2 \leq 0.850$ is more preferable, and $0.100 \leq V2 \leq 0.800$ is still more preferable. As for a ratio of the mesopore volume/the micro-pore volume, $0.22 \leq V1/V2 \leq 10.0$ is more preferable, and $0.25 \leq V1/V2 \leq 10.0$ is still more preferable. In the case where they are over the upper limit, i.e., at the mesopore volume V1 of higher than 0.5, and at the micro-pore volume V2 of higher than 1.0, it is necessary to allow to deposit more amount of the pitch coal in order to obtain a pore structure of the above-described composite pore material of the present invention, which makes difficult to control the pore structure.

The production step of the above-described composite porous material is characterized by having less occurrence of aggregation, and having little change in average particle size before and after deposition, even after being allowed to deposit a pitch coal on the surface of the activated carbon, different from general surface coating. From such characteristics of the production step of the above-described composite porous material, and the fact that the micropore volume and the mesopore volume decrease after the deposition, as will be clarified in Examples to be described later, in the present invention, it is estimated that a large portion of volatilized components or thermally decomposed components of the pitch is deposited inside pores of the activated carbon, and a conversion reaction of this deposited component to the pitch coal was enhanced.

Average particle size of the composite porous material in the present invention, as mentioned above, is nearly the same as that of the activated carbon before the deposition, and it is preferable to be 1 μm to 10 μm (inclusive). As for the lower limit, it is more preferably 2 μm or larger, and still more preferably 2.5 μm or larger. As for the upper limit, it is more preferably 6 μm or smaller, and still more preferably 4 μm or smaller. At the average particle size of 2 μm to 10 μm (inclusive), sufficient durability can be maintained. A measurement method of the average particle size of the composite porous material, referred to here, is a similar method for the activated carbon used as the above-mentioned raw material.

In the above-described composite porous material, average pore size is preferably 28 Å or larger, and more preferably 30 Å or larger, in view of obtaining high output characteristic. On the other hand, it is preferably 65 Å or smaller, and more preferably 60 Å or smaller, in view of obtaining the high energy density. In the present description, the average pore size is the value determined from total pore volume per weight, obtained by measuring each equilibrium adsorption amount of nitrogen gas under each relative pressure at liquid nitrogen temperature, divided by BET specific surface area.

Atomic ratio of hydrogen atom/carbon atom (hereafter it may also be referred to as H/C), in the above-described composite porous material, is preferably 0.05 to 0.35 (inclusive), and more preferably 0.05 to 0.15 (inclusive). At the H/C of over the upper limit value, capacitance (the energy density) and charge/discharge efficiency decrease, because a polycyclic aromatic conjugated structure of the carbonaceous material deposited to the surface of the activated carbon is not developed sufficiently. On the other hand, at the H/C of below the lower limit value, the sufficient energy density may not be obtained, because carbonization proceeds excessively. The H/C is measured by an element analysis apparatus.

The above-described composite porous material has an amorphous structure derived from a raw material activated carbon, as well as a crystal structure derived from mainly a carbon material deposited. According to a wide-angle X-ray diffraction method, as for the composite porous material, the material having a spacing $d_{002}$ of the (002) plane of 3.60 Å to 4.00 Å (inclusive), and a crystallite size Lc in a c-axis direction, obtained from half peak width of this peak, of 8.0 Å to 20.0 Å (inclusive) is preferable, and the material having the $d_{002}$ of 3.60 Å to 3.75 Å (inclusive), and a crystallite size Lc in a c-axis direction, obtained from half peak width of this peak, of 11.0 Å to 16.0 Å (inclusive) is more preferable.

Into the negative electrode active material layer, conductive fillers and the binder can be added, as needed, other than the negative electrode active material. Type of the conductive fillers is not particularly limited, and acetylene black, Ketjen black, and vapor phase grown carbon fiber are exemplified. The addition amount of the conductive fillers is preferably 0 to 30% by mass relative to the negative electrode active material. The binder is not particularly limited; however, PVdF (polyvinylidene fluoride), PTFE (polytetrafluoroethylene), or a styrene-butadiene copolymer can be used. The addition amount of the binder is preferably, for example, in a range of 3 to 20% by mass relative to the negative electrode active material.

The negative electrode for the non-aqueous lithium type electrical storage element can be produced by a known electrode formation method in the lithium ion battery, or the electric double layer capacitor, and it can be obtained, for example, by carrying out coating of the active material layer onto the collector, by dispersing the positive electrode active material, the conductive fillers, and the binder in a solvent, and making a slurry state, followed by drying, and pressing, as needed. It is possible to paste the active material, which is molded by press after dry mixing without using a solvent, onto the collector using a conductive adhesive.

The negative electrode for the non-aqueous lithium type electrical storage element may be the electrode where the negative electrode active material layer is formed only at one-side of the collector, or may be the electrode where it is formed at both-sides. Thickness of the negative electrode active material layer is 15 μm to 45 μm (inclusive), preferably, 20 μm to 40 μm (inclusive), per one-side. At this thickness of 15 μm or thicker, sufficient charge/discharge capacitance can be exerted. On the other hand, at this thickness of 45 μm or thinner, the energy density can be increased by contraction of cell volume.

When there are holes in the collector, thickness of the negative electrode active material layer means average value of the thickness per one-side of a portion of a collector not having holes. In this case, the holes, for example, include a through hole portion of a punching metal, and an open hole portion of an expanded metal.

The bulk density of the negative electrode active material layer is preferably 0.60 g/cm$^3$ to 1.2 g/cm$^3$ (inclusive), and still more preferably 0.70 g/cm$^3$ to 1.0 g/cm (inclusive). At the bulk density of 0.60 g/cm$^3$ or higher, sufficient strength can be maintained, as well as sufficient conductivity between the active materials can be exerted. At the bulk density of 1.2 g/cm$^3$ or lower, holes enabling to sufficiently diffuse ions inside the active material layer can be secured.

A material of the negative electrode collector is not particularly limited, as long as it does not cause deterioration such as elution or a reaction, after forming the electrical storage element, and includes, for example, copper, iron, and stainless steel. In the negative electrode for the non-aqueous lithium type electrical storage element of the present invention, it is preferable to use copper as the negative electrode collector. As for the shape of the negative electrode collector, a metal foil or a structure capable of forming an electrode in a gap of a metal can be used. The metal foil may be a usual metal foil not having through holes, or may be a metal foil having through holes, such as an expanded metal, a punching metal, and an etching foil. The thickness of the negative electrode collector is not particularly limited, as long as shape or strength of the negative electrode can be maintained sufficiently, and for example, 1 to 100 μm is preferable.

As a method for pre-doping lithium ions to the negative electrode for the non-aqueous lithium type electrical storage element, a known method can be used. For example, the method includes a method for pre-doping lithium ions electrochemically, after molding the negative electrode active material to an electrode, using the negative electrode as a working electrode, and metal lithium as a counter electrode, to prepare an electrochemical cell by combination of a non-aqueous electrolytic solution. It is possible to pre-dope lithium ions to the negative electrode, by crimping a metal lithium foil to the negative electrode, and charging the non-aqueous electrolytic solution.

In view of providing the negative electrode superior in all of the energy density, output characteristic and durability, it is preferable that the negative electrode active material where the pitch coal is allowed to deposit to the surface of the activated carbon contains the composite porous material, and the negative electrode active material satisfies both of following i) and ii):

i) the weight ratio of the pitch coal to the activated carbon is 10% to 60% (inclusive), and softening point of the pitch, which is a raw material of the pitch coal, is 100° C. or lower; and ii) the negative electrode active material has a BET specific surface area of 350 m$^2$/g to 1500 m$^2$/g, and lithium ions are doped in an amount of 1100 mAh/g to 2000 mAh/g per unit weight.

In more detail, to enhance the energy density [capacitance of the electrical storage element (mAh)/volume of the negative electrode (cm$^3$)], it is preferable to adjust thickness of the negative electrode active material layer to attain 15 μm to 45 μm (inclusive), as well as to adjust pitch coal/activated carbon (weight ratio), and softening point of the pitch in a range where durability of the negative electrode is not impaired, as well as pre-doping amount of lithium ions can be increased.

<Positive Electrode>

The positive electrode for the non-aqueous lithium type electrical storage element in the present invention is the one laid with a positive electrode active material layer on a positive electrode collector.

<Positive Electrode Active Material>

The positive electrode active material layer contains the positive electrode active material and a binder, as well as conductive fillers, as needed. As the positive electrode active material, following activated carbon 1 or activated carbon 2 is preferably used.

(Activated Carbon 1)

A type of the activated carbon 1 and a raw material thereof are not particularly limited, however, it is preferable that pores of the activated carbon are optimally controlled, so as to satisfy both high capacitance (i.e., the high energy density) and high output characteristic (i.e., the high output density). Specifically, such an activated carbon is preferable that satisfies $0.3<V1\leq0.8$ and $0.5\leq V2\leq1.0$, provided that V1 (cc/g) is the mesopore volume derived from pores having a size of 20 Å to 500 Å (inclusive), calculated by the BJH method, and V2 (cc/g) is the micro-pore volume derived from pores having a size of smaller than 20 Å, calculated by the MP method, and specific surface area measured by the BET method of 1500 m$^2$/g to 3000 m$^2$/g (inclusive).

The mesopore volume V1 is preferably a value higher than 0.3 cc/g, in view of increasing output characteristic, when a positive electrode material is incorporated in the electrical storage element, as well as preferably 0.8 cc/g or lower, in view of restricting decrease in capacitance of the electrical storage element. The above-described V1 is more preferably 0.35 cc/g to 0.7 cc/g (inclusive), and still more preferably 0.4 cc/g to 0.6 cc/g (inclusive).

On the other hand, the micropore volume V2 is preferably 0.5 cc/g or higher to make specific surface area of the activated carbon 1 larger, as well as to increase capacitance, and preferably 1.0 cc/g or lower, from the viewpoint of suppressing bulk volume of the activated carbon 1, increasing density as an electrode, and increasing capacitance per unit volume. The above-described V2 is more preferably 0.6 cc/g to 1.0 cc/g (inclusive), and still more preferably 0.8 cc/g to 1.0 cc/g (inclusive).

The ratio of the mesopore volume V1 to the micro-pore volume V2 (V1/V2) is preferably in a range of $0.3 \leq V1/V2 \leq 0.9$. That is, it is preferable that V1/V2 is 0.3 or higher in view of increasing the ratio of the mesopore volume to the micropore volume, in a degree of being capable of restricting decrease in output characteristic, while acquiring high capacitance, as well as it is preferable that V1/V2 is 0.9 or lower, in view of increasing the ratio of the micropore volume to the mesopore volume, in a degree of being capable of restricting decrease in capacitance, while acquiring high output characteristic. More preferable range of V1/V2 is $0.4 \leq V1/V2 \leq 0.7$, and still more preferable range of V1/V2 is $0.55 \leq V1/V2 \leq 0.7$.

The micro-pore volume and the mesopore volume of the activated carbon 1 are values determined by the similar method as in the above-mentioned composite porous material.

Average pore size of the activated carbon 1 is preferably 17 Å or larger, more preferably 18 Å or larger, and most preferably 20 Å or larger, in view of maximizing output. It is preferably 25 Å or smaller, in view of maximizing capacitance. The average pore size described in the present description indicates the value determined from total pore volume per weight, obtained by measuring each equilibrium adsorption amount of nitrogen gas under each relative pressure at liquid nitrogen temperature, divided by BET specific surface area.

The BET specific surface area of the activated carbon 1 is preferably 1500 m$^2$/g to 3000 m$^2$/g (inclusive), and more preferably 1500 m$^2$/g to 2500 m$^2$/g (inclusive). In the case where the BET specific surface area is 1500 m$^2$/g or larger, the good energy density is obtained easily, and on the contrary, in the case where the BET specific surface area is 3000 m$^2$/g or smaller, performance per electrode volume tends to be enhanced, and therefore it is not necessary to charge a large quantity of a binder to maintain strength of the electrode.

The activated carbon 1 having such characteristics as above can be obtained by using raw materials and a processing method which, for example, will be explained below.

In the embodiments of the present invention, carbon sources used as the raw materials of the activated carbon 1 are not particularly limited, and include, for example, plant-based raw materials, such as wood, wood flour, coconut shell, by-products in producing pulp, bagasse, or molasses; fossil-based raw materials, such as peat, lignite, brown coal, bituminous coal, anthracite, components of petroleum distillation residue, petroleum pitch, coke, or coal tar; various synthetic resins, such as a phenolic resin, a vinyl chloride resin, a vinyl acetate resin, a melamine resin, a urea resin, a resorcinol resin, a celluloid, an epoxy resin, a polyurethane resin, a polyester resin, or a polyamide resin; synthetic rubber, such as polybutylene, polybutadiene, or polychloroprene; other synthetic wood, synthetic pulp, and carbonized materials thereof. Among these raw materials, plant-based raw materials, such as coconut shell, or wood flour, and carbonized products thereof are preferable, and the carbonized products of coconut shell are particularly preferable.

As a method of carbonization and activation to convert these raw materials to the above-described active carbon 1, for example, a well-known method, such as a fixed-bed method, a moving bed method, a fluidized bed method, a slurry method, or a rotary kiln method, can be employed.

The carbonization method of these raw materials includes a method in which calcining is carried out at about 400 to 700° C. (preferably at 450 to 600° C.) for about 30 minutes to 10 hours, by using inert gas, such as nitrogen, carbon dioxide, helium, argon, xenon, neon, carbon monoxide, or flue gas, or mixed gas with other gas composing these inert gases as main components.

As the activation method for the carbonized product obtained by the above-described carbonization method, a gas activation method for calcining using activation gas of steam, carbon dioxide, or oxygen, is preferably used. Among these, a method using steam or carbon dioxide, as activation gas, is preferable.

In this activation method, it is preferable to activate the above-described carbonized product by increasing temperature up to 800 to 1000° C. taking 3 to 12 hours (preferably 5 to 11 hours, and still more preferably 6 to 10 hours), while supplying activation gas in a rate of 0.5 to 3.0 kg/hr (preferably 0.7 to 2.0 kg/hr).

The above-described carbonized product may be subjected to primary activation in advance, before carrying out activation processing of the above-described carbonized product. In this primary activation, normally, the carbonized product can be gas activated by calcining it at a temperature lower than 900° C., using activation gas of steam, carbon dioxide, or oxygen.

By combining calcining temperature and calcining time in the above-described carbonization method, as well as activation gas supply amount, temperature rising rate, and highest activation temperature in the above-described activation method, as appropriate, the activated carbon 1 having the characteristics as above, which can be used in the embodiment of the present invention, can be produced.

It is preferable that average particle size of the activated carbon 1 is 1 to 20 μm. The average particle size described in the present description indicates particle size at which the accumulated curve is 50% (i.e., 50% size (Median size)), in determining the accumulated curve, based on total volume as 100%, in measurement of particle size distribution using a particle size distribution measurement apparatus.

At the above-described average particle size of 1 μm or larger, capacitance per electrode volume tends to increase, because of high density of the active material layer. On the other hand, at the above-described average particle size of 20 μm or smaller, conformity to high speed charge/discharge tends to be easy. The average particle size is preferably 2 to 15 μm, and still more preferably 3 to 10 μm.

(Activated Carbon 2)

It is preferable that the positive electrode active material contains the activated carbon 2 which satisfies $0.8 < V1 \leq 2.5$ and $0.92 < V2 \leq 3.0$, provided that V1 (cc/g) is the mesopore volume derived from pores having a size of 20 Å to 500 Å, calculated by the BJH method, and V2 (cc/g) is the micropore volume derived from pores having a size of smaller than 20 Å, calculated by the MP method.

The mesopore volume V1 is preferably a value higher than 0.8 cc/g, in view of increasing output characteristic, when the positive electrode material is incorporated in the electrical storage element, as well as preferably 2.5 cc/g or lower, in view of restricting decrease in capacitance of the electrical storage element. The V1 is more preferably 1.00 cc/g to 2.0 cc/g (inclusive), and still more preferably 1.2 cc/g to 1.8 cc/g (inclusive).

On the other hand, the micropore volume V2 is preferably 0.92 cc/g or higher to make specific surface area of the activated carbon 2 larger, as well as to increase capacitance, and preferably 3.0 cc/g or lower, from the viewpoint of increasing density as an electrode of the activated carbon 2, and increasing capacitance per unit volume. The V2 is more preferably larger than 1.0 cc/g and 2.5 cc/g or less, and still more preferably 1.5 cc/g to 2.5 cc/g (inclusive).

The activated carbon 2 having the above-mentioned mesopore volume and the micro-pore volume results in higher BET specific surface area as compared with the activated carbon which has been used for a conventional electric double layer capacitor or a lithium ion capacitor. Typical value of the BET specific surface area is 2600 $m^2$/g to 4500 $m^2$/g (inclusive), and preferably 3000 $m^2$/g to 4000 $m^2$/g (inclusive). In the case where the BET specific surface area is 2600 $m^2$/g or larger, the good energy density is obtained easily, and on the contrary, in the case where the BET specific surface area is 4500 $m^2$/g or smaller, performance per electrode volume tends to be enhanced, because of no necessity of charging a large quantity of a binder to maintain strength of the electrode.

The activated carbon 2 having such characteristics as above can be obtained by using raw materials and a processing method which, for example, will be explained below.

A carbonaceous materials used as the raw materials of the activated carbon 2 are not particularly limited, as long as they are carbon sources usually used as raw materials of an activated carbon, and include, for example, plant-based raw materials, such as wood, wood flour, or coconut shell; fossil-based raw materials, such as petroleum pitch, or coke; various synthetic resins, such as a phenolic resin, a furan resin, a vinyl chloride resin, a vinyl acetate resin, a melamine resin, a urea resin, or a resorcinol resin. Among these raw materials, a phenolic resin and a furan resin are particularly preferable because they are suitable for preparing the activated carbon 2 having high specific surface area.

As a method of carbonization or heating in activation treatment of these raw materials, the method includes, for example, a well-known method, such as, a fixed-bed method, a moving bed method, a fluidized bed method, a slurry method, and a rotary kiln method. As atmosphere in heating, inert gas, such as nitrogen, carbon dioxide, helium, or argon, or mixed gas with another gas composing these inert gases as main components can be used. It is a general method for calcining at a carbonization temperature of about 400 to 700° C., for about 30 minutes to 10 hours.

[Pulverizing and Classification Step]

In the present invention, it is important that the above-described carbonaceous material (carbonized product) is pulverized and classified in advance before activation, since the activation can be carried out efficiently, as well as characteristics decrease by newly generated interface, in the case where pulverizing is carried out after the activation, can be prevented.

Explanation will be given below on a method for pulverizing the carbonaceous material in advance.

The pulverizing method may be any of dry-type pulverizing and wet-type pulverizing, however, the wet-type pulverizing is preferable, in view of pulverizing speed, continuous operability and power consumption amount. In the case of the wet-type pulverizing, the following conditions can be employed specifically. Pulverizing is carried out firstly by feeding a material to be pulverized, hard beads, such as a metal, zirconia, or ceramics, and a solvent into a hard container of a metal, agate, or ceramics. As for the container, the container which can be sealed is preferable, and it is preferable to replace air inside the container with inert gas, such as nitrogen, or argon, when pulverizing is carried out. As for the solvent, water or an organic solvent can be used; however, an organic solvent having a low boiling point is not suitable, due to a risk of ignition. The pulverizing time is adjusted by particle size of the resulting product; however, pulverizing for a long period of time could result in contamination of impurities. Because particle size distribution is widened by pulverizing, it is preferable to carry out classification using a sieve. As a result of classification, in the present invention, classification between 1 μm and 30 μm can be carried out. The carbonaceous material, obtained by the above-described pulverizing and classification steps, is carbonized by the following method to obtain a carbonized product.

As the activation method for the carbonized product after the pulverizing and the classification, there are a gas activation method by calcining using activation gas, such as steam, carbon dioxide, or oxygen, and an alkali metal activation method by carrying out heat treatment after mixing with an alkali metal compound. The alkali metal activation method is preferable to prepare an activated carbon having high specific surface area. In this activation method, after mixing the carbonized product and the alkali metal compound, such as KOH or NaOH, so as to attain a weight ratio of 1:1 or higher, the heating is carried out under inert gas atmosphere in a temperature range of 600 to 900° C., for 0.5 to 5 hours, and then the alkali metal compound is removed by washing with an acid and water followed by drying.

In the present invention, a mass ratio of the carbonized product and the alkali metal compound (=carbonized product:alkali metal compound) is 1:1 or higher, and with the more increase in the alkali metal compound, the mesopore volume increases the more, however, at the mass ratio boundary of about 1:3.5, the pore volume tends to increase abruptly. Therefore, the mass ratio of 1:3 or higher, i.e., the alkali metal compound increases the more, is preferable, and 1:5.5 or lower is preferable. As for the mass ratio, with the more increase in alkali metal compound, pore volume increases the more; however, in consideration of treating efficiency of washing, etc., after that, it is preferable to be the above-described range.

To increase the micropore volume and not to increase the mesopore volume, a more volume of the carbonized product is mixed with KOH in activation. To increase both of the pore volumes, KOH is mixed more in the ratio of the carbonized material and KOH. To increase mainly the mesopore volume, steam activation is carried out after carrying out the activation treatment with alkali.

Average particle size of the activated carbon 2 used in the non-aqueous lithium type electrical storage element of the present invention is 1 μm to 30 μm (inclusive), preferably 2 μm to 20 μm (inclusive), and more preferably 2 μm to 7 μm (inclusive). A mixture of two types of the activated carbons having different average particle size may be used. The average particle size here indicates particle size at which the accumulated curve is 50% (i.e., 50% size (Median size)), in determining the accumulated curve, based on total volume as 100%, in measurement of particle size distribution using a particle size distribution measurement apparatus.

In the case where the positive electrode active material contains a material (for example, an activated carbon not having the specific V1 and V2, a composite oxide of lithium and a transition metal, etc.) other than the activated carbon having the specific V1 and V2, the content of the activated carbon having the specific V1 and V2 should be higher than 50% by weight of total positive electrode active material.

The content of the activated carbon having the specific V1 and V2 in the total positive electrode active material is more preferably 70% by weight or higher, still more preferably 90% by weight or higher, and most preferably 100% by weight.

<Other Components of Positive Electrode Active Material Layer, and Molding of Positive Electrode)

The positive electrode may be the electrode formed with the positive electrode active material layer only at one-side of the positive electrode collector, or may be the electrode formed with it at both-sides. Thickness of the positive electrode active material layer is, preferably, for example, 30 μm to 200 μm (inclusive) per one-side.

A material of the positive electrode collector is not particularly limited, as long as it is a conductive material not causing deterioration, such as elution into the electrolytic solution or reactions, after making the electrical storage element. As a suitable material, aluminum is included. As the shape of the positive electrode collector, a metal foil or such a structure (foam, etc.) that an electrode can be formed at a gap of a metal, can be used. The metal foil may be a usual metal foil not having through holes, or may be a metal foil having through holes, such as an expanded metal, or a punching metal. Thickness of the positive electrode collector is not particularly limited, as long as the shape and the strength of the electrode can be maintained sufficiently, however, for example, 1 to 100 μm is preferable, in view of strength, conductive resistance and capacitance per volume.

A binder used in the positive electrode active material layer is not particularly limited; however, PVDF (polyvinylidene fluoride), PTFE (polytetrafluoroethylene), or a styrene-butadiene copolymer can be used. Content of the binder in the positive electrode active material layer is preferably, for example, in a range of 3 to 20% by mass relative to 100 parts by mass of the positive electrode active material. Into the positive electrode active material layer, conductive fillers can be mixed, as needed. Types of the conductive fillers is not particularly limited; however, acetylene black, Ketjen black, and vapor phase epitaxy carbon fiber are exemplified. The addition of the conductive fillers is preferably, for example, 0 to 30% by mass relative to 100 parts by mass of the active material.

The positive electrode can be manufactured by utilizing a known electrode formation method in the lithium ion battery, or the electric double layer capacitor. It can be obtained, for example, by carrying out a coating step for coating slurry, dispersed with the positive electrode active material, electric conductive fillers and a binder in a solvent, onto the positive electrode collector as the positive electrode active material layer; a drying step for drying the solvent; and a pressurizing step for enhancing the bulk density of the positive electrode active material layer by pressurization.

The bulk density of the positive electrode active material layer is 0.40 g/cm$^3$ or higher, and preferably in a range of 0.45 g/cm$^3$ to 0.70 g/cm$^3$ (inclusive). At the bulk density of 0.40 g/cm$^3$ or higher, electrode capacitance per volume can be increased, and down-sizing of the electrical storage element can be attained. At the bulk density of 0.70 g/cm$^3$ or lower, it is believed that diffusion of the electrolytic solution in a void (pore) inside the positive electrode active material layer is sufficient, and charge/discharge characteristic at high current is high.

The bulk density of the positive electrode active material layer used in one embodiment of the present invention, is smaller than the bulk density of an active material layer of a usual activated carbon prepared by the same method, caused by having specific micropore volume and mesopore volume. In that case, to attain the above-described bulk density, in a state of formation as the positive electrode active material layer, for example, a pressurization method under heating, using a roll having surface temperature thereof set at a temperature of the melting point of the binder minus 40° C. or higher and of the melting point or lower, can be used (hereafter, it may also be referred to as "heating press").

It may be carried out by a formation step for mixing the activated carbon and the binder in a dry system without using a solvent, molding the mixture to a plate-shape by pressing under heat at a temperature of the melting point of the binder minus 40° C. or higher to the melting point of the binder or lower; and a pasting step for pasting the formed positive electrode active material layer to the positive electrode collector using conductive adhesives. The melting point can be determined by an endothermic peak position in DSC (differential scanning calorimetry). For example, the temperature of an endothermic peak in temperature rising process is the melting point, which is obtained by setting 10 mg of a sample resin at a measurement cell, using a differential scanning calorimeter, "DSC7", manufactured by Perkin Elmer Corp., and increasing temperature from 30° C. up to 250° C. at a temperature rate of 10° C./min, under a nitrogen gas atmosphere.

The heating press method can be carried out, for example, by the following steps. Explanation of the equipment used in the heating press will be given referring to FIG. 3.

Figure 3:
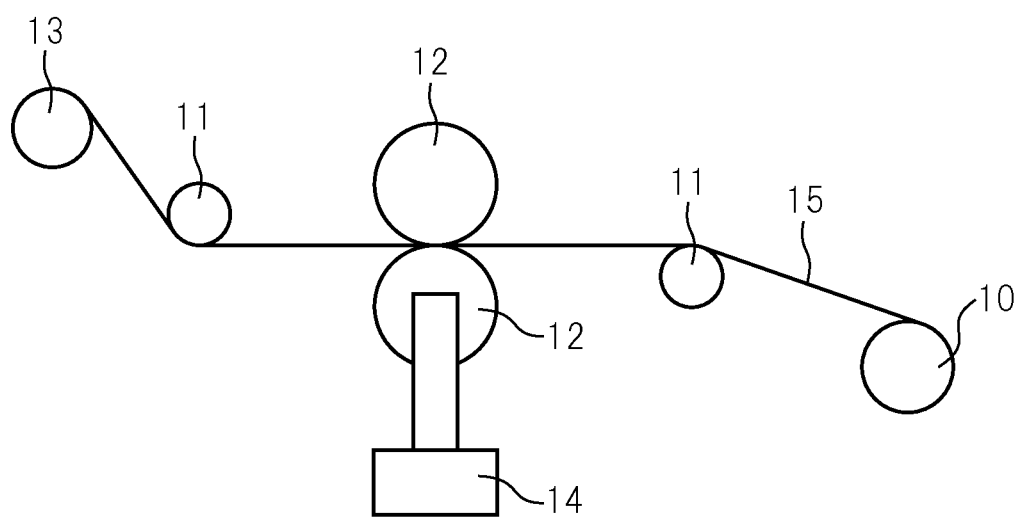
FIG. 3 is a schematic view of apparatus used in a heating press.

A feeding roll (10), onto which a positive electrode (15) of the positive electrode collector coated with the positive electrode active material layer is wound-up, is positioned at the feed roll position. As shown in FIG. 3, the positive electrode (15) is wound-up to a winding roll (13) sequentially via the first guide (11), a heating press roll (12) and the second guide (11).

Surface temperature of the heating press roll (12) is set at a temperature of the melting point minus 40° C. or higher to the melting point or lower, of the binder contained in the positive electrode active material layer. It is selected preferably from temperature of the melting point minus 30° C. or higher, and the melting point or lower, and more preferably the melting point minus 20° C. or higher, and the melting point or lower. For example, in the case where PVDF (polyvinylidene fluoride:melting point is 150° C.) is used as the binder, heating in a range of 110 to 150° C. is preferable, and heating within a range of 120 to 150° C. is more preferable. In the case where a styrene-butadiene copolymer (melting point is 100° C.) is used as the binder, heating in a range of 60 to 100° C. is preferable, and heating in a range of 70 to 100° C. is more preferable.

Pressurization pressure in carrying out heating press and speed in carrying out press are adjusted by the bulk density of the resulting positive electrode. The press pressure of the heating press roll is kept constant by adjusting pressure of a hydraulic cylinder (14). The pressure of the press is preferably 50 kgf/cm to 300 kgf/cm (inclusive). The press speed is preferably 15 m/min or slower, more preferably 10 m/min or slower, and still more preferably 5 m/min or slower. When the press speed is in the above-described range, sufficient bulk density can be obtained.

When the pressure of the press is too high, because the active material layer is peeled from the collector, it is preferable that the press pressure is determined by measuring cell resistance or retention rate of discharge capacitance.

Distance between press rolls themselves (roll gap) can be selected arbitrarily. In the first press, the press is carried out in a roll gap of at least narrower than the thickness of the electrode to be pressed. It is preferable to select the roll gap by measuring the cell resistance or the retention rate of discharge capacitance, because effect of increasing the bulk density by the press is small at the roll gap being close to the thickness of the electrode, and the active material layer is peeled off from the electrode collector at too narrow distance.

The positive electrode of the present invention is preferably subjected to the press two times or more. By one time press, the bulk density cannot be increased sufficiently, or it is necessary to adopt too high pressure of the press or too narrow roll gap, to increase the bulk density, it causes peeling or decrease in performance of the cell resistance or the retention rate of discharge capacitance. In the case of significant damage of the positive electrode, there may be the case where the cell preparation cannot be carried out.

For example, in the case of carrying out the press two or more times, it is preferable that the roll gap in the second press is the same as in the first press, or more preferably narrower than in the first press. The required bulk density can be obtained, specifically, by carrying out the press under the condition that the roll gap in the second press is 0.4 to 0.6, provided that the roll gap in the first press is 1, and in the case of carrying out also the third press, the roll gap in the third press is 0.2 to 0.4, provided the roll gap in the second press is 1. The press may be further carried out as needed. However, in view of production efficiency, number of the times for the press is preferably in the level of two or three times. In the case of pressing two or more times, the first press may be carried out at room temperature.

The pressure in the second press may be the same or higher relative to the pressure in the press carried out at the first time. The higher press pressure is the more preferable in view of enhancing density.

The heating press roll (12) is rotated on its own axis in a direction for the positive electrode (15) being sent from the feeding roll (10) to winding roll (13), and controlled to arbitrary speed. The winding roll (13) rotates on its own axis so that tension of the electrode is suitable value to wind-up the positive electrode (15). The feeding roll (10) is not necessary to rotate on its own axis; however, it is desirable to provide load which furnishes tension in a degree for the positive electrode (15) not to be loosened.

<Separator>

The separator plays roles of insulating the positive electrode body and the negative electrode body, so that they do not directly contact electrically, as well as forming a conducting path of lithium ions between the electrodes, by holding the electrolytic solution in a void (pore) inside thereof.

In the embodiment of the present invention, the separator contains a polyolefin porous membrane and an insulating porous membrane formed on one-side of the polyolefin porous membrane. By using the separator of the present invention, the insulating porous membrane suppresses temperature rise of the capacitor at the time of internal short circuiting and suppresses occurrence of gasification, smoking and ignition, as well as low resistance (i.e., high output density) and the high cycle characteristic can be obtained by the polyolefin porous membrane.

As shown in FIG. 1, the separator of the present invention is a two-layer laminated separator (hereafter it may also be referred to as "laminated separator"), where the polyolefin porous membrane (1) and the insulating porous membrane (2), formed on one-side of the polyolefin porous membrane (1), are laminated.

The lithium ion capacitor of the present invention is characterized by having a laminated structure so that the insulating porous membrane of the separator contacts with the negative electrode body.

Effect that the lithium ion capacitor of the present invention exerts by having such laminated structure that the insulating porous membrane of the separator contacts with the negative electrode body, is estimated as follows.

In the lithium ion capacitor, the energy capacitance of the negative electrode is far larger as compared with the positive electrode. Therefore, thermal runaway can be prevented, and occurrence of gasification, smoking and ignition is therefore difficult, and thus high safety of the lithium ion capacitor can be secured at the time of internal short circuiting, by facing the insulating porous membrane of the separator and the negative electrode body.

In the lithium ion capacitor, the positive electrode has faster ion adsorption and desorption in charge/discharge, as compared with the negative electrode, therefore decrease of that speed results in increase in resistance of a device. Accordingly the high output density can be obtained without increasing resistance of the device, by facing the polyolefin membrane, which has lower diffusion resistance as compared with the insulating porous membrane, to the positive electrode side.

Still more, the polyolefin porous membrane is inferior in liquid retaining property; however, high cycle characteristic can be obtained without generating liquid exhaustion inside the separator in cycling of the device, by the presence of the insulating porous membrane superior in liquid retaining property.

Accordingly, in the present invention, a two-layer structure is more preferable, where the polyolefin porous membrane (1) and the insulating porous membrane (2) are laminated one layer by one layer, to obtain the lithium ion capacitor having low resistance and the high cycle characteristic, although the polyolefin porous membrane (1) and the insulating porous membrane (2) may be laminated in multiple, and of course the polyolefin porous membrane (1) and the insulating porous membrane (2) may be laminated alternately in multiple, as long as the insulating porous membrane come in contact with the negative electrode side, and the polyolefin membrane contacts with the positive electrode side.

In a lithium ion secondary battery, difference between the energy capacitance of the positive electrode and that of the negative electrode is not so large as compared with the level of the lithium ion capacitor. Accordingly, in the case of using the separator having the laminated structure of the present invention, the insulating porous membrane is generally arranged so as to face to the positive electrode body, which is in a highly oxidized state, to suppress oxidation of the separator. Utilizing the insulating porous membrane is completely different from the present invention, where the insulating porous membrane of the separator, having a laminated structure, is faced to the negative electrode body, because the energy capacitance of the negative electrode is much higher as compared with the positive electrode.

In the laminated separator pertaining to the present invention, it is preferable that a ratio of thickness of the insulating porous membrane relative to the polyolefin porous membrane is 0.25 to 1.00. At the ratio of thickness of the insulating porous membrane relative to the polyolefin porous membrane of 0.25 or larger, rise in capacitor temperature in internal short circuiting can be sufficiently suppressed, and sufficient liquid retaining property of the electrolytic solution can be exerted, and thus it is preferable. On the other hand, at the ratio of 1.00 or smaller, large increase in ion diffusion resistance can be suppressed, and sufficient output characteristic can be exerted, and thus it is preferable.

The thickness of the whole separator is preferably 8 μm to 65 μm (inclusive)

In the embodiment of the present invention, it is preferable that a piercing strength (absolute strength) of the separator is preferably 200 g or higher, and more preferably 400 g or higher. To make the piercing strength 200 g or higher is preferable, from the viewpoint that generation of a pinhole or a crack can be decreased in the case of using the microporous membrane as the separator for the capacitor, even in the case where a sharp part of the material such as the electrode material provided in the capacitor pierces into the microporous membrane. The upper limit of the piercing strength is not particularly limited; however, it is preferable to be 1000 g or lower. The piercing strength is measured in accordance with the method described in the following Examples.

A Brugmann index of the separator is preferably 2.5 to 3.5, which is measured and calculated using methyl ethyl carbonate as a probe molecule. The Brugmann index means a value for expressing quality of a membrane pore structure not depending on porosity that is calculated using diffusion coefficients (D) of methyl ethyl carbonate in a membrane thickness direction of the separator, which are obtained by Pulsed Field Gradient Nuclear Magnetic Resonance method (PFG-NMR method).

In the case where the separator is the polyolefin porous membrane, the Brugmann index is calculated by $\varepsilon \times D = \varepsilon \alpha \times D_0$ (wherein, $\varepsilon$ represents membrane porosity, $D_0$ represents diffusion coefficient of methyl ethyl carbonate in free space at 30° C., and $\alpha$ represents the Brugmann index).

In the case where the separator is a laminated porous membrane of the polyolefin porous membrane and the insulating porous membrane, methyl ethyl carbonate in the polyolefin porous membrane, and methyl ethyl carbonate in the insulating porous membrane are detected as separate peaks using a PFG-NMR method, therefore, diffusion coefficients each in individual membrane thickness direction are calculated. In this case, the Brugmann index is calculated by $L1/(L1+L2) \times \varepsilon 1 \times D1 + L2/(L1+L2) \times \varepsilon 2 \times D2 = (L1/(L1+L2) \times \varepsilon 1 + L2/(L1+L2) \times \varepsilon 2) \alpha \times D_0$ (wherein L1: membrane thickness of the polyolefin porous membrane, L2: membrane thickness of the insulating porous membrane, $\varepsilon 1$: porosity of the polyolefin porous membrane, $\varepsilon 2$: porosity of the insulating porous membrane, D1: diffusion coefficient of membrane thickness direction of methyl ethyl carbonate in the polyolefin porous membrane at 30° C., D2: diffusion coefficient of membrane thickness direction of methyl ethyl carbonate in the insulating porous membrane at 30° C., D0: diffusion coefficient of methyl ethyl carbonate in free space at 30° C., and $\alpha$: the Brugmann index).

Accordingly, a pore structure with the smaller Brugmann index results in providing the more superior ion diffusion. At the present index of 2.5 or larger, strength of a membrane can be maintained, while at the present index of 3.5 or smaller, a pore structure sufficiently suitable for an ion to diffuse can be obtained. This index is measured in accordance with a method described in the following Example.

In the embodiment of the present invention, it is preferable that, when the separator is kept at 100° C. for 1 hour in a unconstrained state, thermal shrinkage of the separator is 0% to 3% (inclusive) in any of the MD direction (forward direction when the separator formed in sheet-like film is wound-up onto a roll, and it is also referred to as "longer side direction"), and the TD direction (direction orthogonal to the MD direction, and it is also be referred to as "width direction" or "shorter side direction"). At the thermal shrinkage of 3% or smaller, a big temperature rise can be suppressed, which is caused by flow of a large quantity of current by instantaneous internal short circuiting by melt down of the separator. In the present description, "an unconstrained state" means a state that a subject is not fixed, and for example, means that the separator in a sheet-state is placed into an oven as it is. This thermal shrinkage is measured in accordance with the method described in the following Examples.

The thermal shrinkage can be adjusted by optimizing the stretching temperature at heat setting and stretching ratio.

A means to form the microporous membrane provided with various characteristics as described above, includes, for example, a method for optimizing ratio between thickness of the polyolefin porous membrane and thickness of the insulating porous layer, the polyolefin concentration in extrusion, formulation ratio of various polyolefins such as polyethylene or polypropylene, in the polyolefin, molecular weight of the polyolefin, stretching ratio, stretching operation and relaxation operation after extraction; and a method for optimizing type and particle size of insulating particles in the insulating porous layer, and formulation ratio of the insulating particles and a binder.

<Constitutional Elements of Separator>

Explanation will be provided below on the polyolefin porous membrane and the insulating porous membrane, which are constitutional elements of the separator.

<Polyolefin Porous Membrane>

The polyolefin porous membrane is a porous membrane formed of a polyolefin.

In the embodiment of the present invention, it is preferable that a thickness of the polyolefin porous membrane is 5 μm to 35 μm (inclusive). At the thickness of the polyolefin porous membrane of 5 μm or thicker, micro short circuiting of the capacitor can be inhibited, and is further capable of sufficiently impregnating an electrolytic solution, and thus it is preferable. On the other hand, at the thickness of 35 μm or thinner, an increase in ion diffusion resistance can be suppressed, and high output density of the capacitor can be exerted, and thus it is preferable. It is more preferable that thickness of the polyolefin porous membrane is 20 μm or thinner.

In the embodiment of the present invention, a porosity of the polyolefin porous membrane is preferably 50% to 75%. It is preferable to set the porosity at 50% or more, from the viewpoint of following rapid move of lithium ions in high rate, in the case where the polyolefin porous membrane is used as a part of the separator. On the other hand, it is preferable to set the porosity at 75% or less, from the viewpoint of enhancement of membrane strength, and also from the viewpoint of self-discharge inhibition, in the case where the polyolefin porous membrane is used as a part of the separator. The porosity is measured in accordance with the method described in the following Examples.

It is preferable that a pore size of the polyolefin porous membrane is 0.01 μm to 0.1 μm, and number of pores is 100 to 250 pores/μm$^2$. The pore size of 0.01 μm or larger is sufficient for diffusion of an ion, while at the pore size of 0.1 μm or smaller, roughness of membrane surface can be made small, and thus short circuiting caused by biting of an electrode can be prevented. At the number of pores of 100 pores/μm$^2$ or more, sufficient void (pore) for ion diffusing can be obtained, while at the number of pores of 250 pores/μm$^2$ or less, strength of the membrane can be maintained. These pore size and number of pores are measured in accordance with methods described in the following Example.

In the embodiment of the present invention, it is preferable that the polyolefin used in forming the polyolefin porous membrane contains polyethylene as an essential component. The polyolefin may be composed of one type of polyethylene, or a polyolefin composition containing multiple types of polyolefins.

The polyolefin includes, for example, polyethylene, polypropylene, and poly-4-methyl-1-pentene, and a mixture blended with two or more types thereof may be used. Hereinafter, polyethylene may be abbreviated as "PE", and polypropylene may be abbreviated as "PP".

A viscosity average molecular weight (Mv) of the polyolefin is preferably 50,000 to 3,000,000, and more preferably 150,000 to 2,000,000. At the viscosity average molecular weight of 50,000 or more, high strength microporous membrane tends to be obtained, and thus it is preferable, as well as at the viscosity average molecular weight of 3,000,000 or less, effect of making the extrusion step easy tends to be obtained, and thus it is preferable. The viscosity average molecular weight is measured in accordance with the method described in the following Examples.

A melting point of the polyolefin is preferably 100 to 165° C., and more preferably 110 to 140° C. The melting point of 100° C. or more is preferable, because functions under high temperature environment tend to be stabilized, and the melting point of 165° C. or less is preferable, because generation of melt down at a high temperature or fuse effect tends to occur. The melting point means temperature of a melting peak in differential scanning calorimetry (DSC). In the case where polyolefins are used as multiple types of mixture, the melting point of the polyolefin means temperature of a peak having the largest melting peak area, in the DSC of the mixture thereof.

As the polyolefin, use of high density polyethylene is preferable, from the viewpoint that heat setting can be carried out at higher temperature, while suppressing clogging of pores.

A ratio of such a high density polyethylene occupying in the polyolefin is preferably 5% by mass or more, and more preferably 10% by mass or more. At the ratio of 5% by mass or more, heat setting can be carried out at higher temperature while further suppressing clogging of pores. On the other hand, the ratio of such a high density polyethylene occupying in the polyolefin is preferably 99% by mass or less, and more preferably 95% by mass or less. At the ratio of 50% by mass or less, the microporous membrane is capable of having not only effect by the high density polyethylene but also effect by other polyolefin, in good balance.

As for the polyolefin, it is preferable to use polyethylene having the viscosity average molecular weight (Mv) of 100,000 to 300,000, from the viewpoint of enhancing shut down characteristic or enhancing safety in a nail penetration test, in the case of using the microporous membrane as the separator of the capacitor.

A ratio of such a polyethylene, having a viscosity average molecular weight of 100,000 to 300,000, occupying in the polyolefin is preferably 30% by mass or more, and more preferably 45% by mass or more. At the ratio of 30% by mass or more, shut down characteristic can be further enhanced, or safety in a nail penetration test can be enhanced, in the case of using the microporous membrane as the separator of the capacitor. On the other hand, the ratio of polyethylene having the viscosity average molecular weight of 100,000 to 300,000, occupying in the polyolefin, is preferably 100% by mass or less, and more preferably 95% by mass or less.

As the polyolefin, polypropylene may be added, from the viewpoint of controlling melt down temperature.

A ratio of such a polypropylene occupying in the polyolefin is preferably 5% by mass or more, and more preferably 8% by mass or more. The ratio of 5% by mass or more is preferable from the viewpoint of enhancing membrane rupture resistance at high temperature. On the other hand, the ratio of polypropylene occupying in the polyolefin is preferably 20% by mass or less, and more preferably 18% by mass or less. The ratio of 20% by mass or less is preferable, from the viewpoint of realizing the microporous membrane having not only effect by polypropylene but also effect by other polyolefin in good balance.

<Insulating Porous Membrane>

The insulating porous membrane is a porous membrane having electric insulating property.

The insulating porous membrane is formed on one-side of the polyolefin porous membrane.

In the embodiment of the present invention, it is preferable that the insulating porous membrane contains insulating particles, and it is more preferable to contain inorganic fillers and a resin binder.

In the embodiment of the present invention, it is preferable that a thickness of the insulating porous membrane is 3 μm to 30 μm (inclusive). At the thickness of the insulating porous membrane of 3 μm or thicker, it is possible to suppress rise in capacitor temperature and control occurrence of gasification, smoking and ignition, at the time of internal short circuiting, and thus it is preferable, while, on the other hand, at the thickness of 30 μm or thinner, increase in ion diffusion resistance can be suppressed, and high output density can be exerted, and thus it is preferable.

The inorganic fillers includes, for example, oxide type ceramics, such as alumina, silica (silicon oxide), titania, zirconia, magnesia, ceria, yttria, a zinc oxide, or an iron oxide; nitride-type ceramics, such as a silicon nitride, a titanium nitride, or a boron nitride; ceramics, such as a silicon carbide, a calcium carbonate, an aluminum sulfate, an aluminum hydroxide, a potassium titanate, talc, kaolin-clay, kaolinite, halloysite, pyrophyllite, montmorillonite, sericite, mica, amesite, bentonite, asbestos, zeolite, a calcium silicate, a magnesium silicate, diatomaceous earth, or silica sand; and a glass fiber.

An average particle size of the inorganic fillers is preferably over 0.1 μm and 4.0 μm or smaller, more preferably over 0.2 μm and 3.5 μm or smaller, and still more preferably over 0.4 μm and 3.0 μm or smaller. At the average particle size of the inorganic fillers of more than 0.1 μm, increase in ion diffusion resistance can be suppressed, and high output density can be exerted easily, and thus it is preferable. At the average particle size of the inorganic fillers of 4.0 μm or smaller, it is easily possible to suppress an increase in capacitor temperature and control gasification, smoking and ignition, at the time of internal short circuiting, and thus it is preferable. A method for adjusting ratio of such particle size can include a method for pulverizing the inorganic fillers by using, for example, a ball mill, a bead mill, or a jet mill, to decrease particle size.

Ratio of the insulating particle occupying in the insulating porous membrane is determined as appropriate from the viewpoint such as, binding property of the inorganic fillers, or ion diffusion resistance and heat resistance of the multilayer porous membrane. It is preferably 50% by mass or larger and smaller than 100% by mass, more preferably 70% by mass to 99.99% by mass (inclusive), still more preferably 80% by mass to 99.9% by mass (inclusive), and even more preferably 90% by mass to 99% by mass (inclusive).

It is preferable that the resin binder is capable of binding the inorganic fillers, insoluble to an electrolytic solution of a lithium ion secondary battery, and electrochemically stable in a use range of the lithium secondary battery.

Such a resin binder includes, for example, polyolefin, such as polyethylene or polypropylene; a fluorine containing resin, such as polyvinylidene fluoride, or polytetrafluoroethylene; a fluorine containing rubber, such as a copolymer of vinylidene fluoride-hexafluoropropylene-tetrafluoroethylene, or a copolymer of ethylene-tetrafluoroethylene; a rubber, such as a copolymer of styrene-butadiene, or a hydride thereof, a copolymer of acrylonitrile-butadiene, or a hydride thereof, a copolymer of acrylonitrile-butadiene-styrene, or a hydride thereof, a copolymer of methacrylate-acrylate, a copolymer of styrene-acrylate, a copolymer of acrylonitrile-acrylate, ethylene-propylene rubber, polyvinyl alcohol, or polyvinyl acetate; a resin having a melting point and/or a glass transition temperature 180° C. or higher, such as polyphenylene ether, polysulfone, polyether sulfone, polyphenylene sulfide, polyether imide, polyamide imide, polyamide, or polyester. They may be used alone or two or more types may be used in combination.

As the resin binder, a resin latex binder is preferable. When the resin latex binder is used, ion permeability is difficult to decrease, and high output characteristic is obtained easily, in laminating a porous layer containing the inorganic fillers and the binder on at least one-side of the polyolefin porous membrane. In addition, even in the case of temperature increase in abnormal generation of heat, smooth shut down is shown and high safety is obtained easily. On the other hand, in the case where a part of or all of the resin binder is dissolved in a solvent, followed by laminating on at least one-side of the polyolefin porous membrane, and binding the resin binder by immersion in a poor solvent or removal of a solvent by drying, not only high output is difficult to obtain but also it is difficult to smoothly shut down and tends to be less safe.

An average particle size of the resin binder in the present embodiment is preferably 50 to 500 nm, more preferably 60 to 460 nm, and still more preferably 80 to 250 nm. At the average particle size of the resin binder of 50 nm or larger, ion permeability is difficult to decrease, and high output characteristic is obtained easily, in laminating a porous layer containing the inorganic fillers and the binder on at least one-side of the polyolefin porous membrane. In addition, smooth shut down is shown and high safety is obtained easily, even in the case of temperature increase in abnormal generation of heat. At the average particle size of the resin binder of 500 nm or smaller, good binding property is exerted, and thermal shrinkage is good and safety tends to be superior, in the use as the multilayer porous membrane.

The average particle size of the resin binder can be controlled by adjusting polymerization time, polymerization temperature, composition ratio of raw materials, charging order of raw materials, or pH.

<Production Method of Laminated Separator (Two-Layer Laminated Separator)>

A production method for the separator according to the embodiment of the present invention will be explained below illustratively. However, the production method of the present embodiment is not particularly limited as for types of polymers, types of insulating particles, types of solvents, an extrusion method, a stretching method, an extraction method, a hole opening method, a heat setting method, or a heat treatment method, as long as the separator as explained above can be obtained.

It is preferable that the production method of the separator includes a step of melt kneading and forming a polymer and a plasticizer, or a polymer, a plasticizer and fillers; a stretching step; an extraction step of the plasticizer (and the fillers, as needed); and a step of heat setting; from the viewpoint of suitably controlling property balance of permeability and membrane strength.

In more specifically, the production method of the separator is possible to include, for example, each step of following (1) to (5):

(1) A kneading step for kneading a polyolefin, the plasticizer, and the fillers, as needed, to form a kneaded product.

(2) A sheet forming step for extruding the kneaded product after the kneading step, forming a sheet shape of a single layer or laminated multiple layers, followed by cooling and solidifying it.

(3) A stretching step for extracting the plasticizer and/or the fillers, as needed, and further stretching the sheet (a sheet like molded material) in one axis or more directions, after the sheet forming step.

(4) A post-processing step for extracting the plasticizer and/or the fillers, as needed, and further carrying out heat treatment, after the stretching step.

(5) A coating step for obtaining the separator by coating a mixture of the insulating particles and the resin binder onto at least one-side of the resulting polyolefin membrane.

As the polyolefin used in the kneading step of the above-described (1), the polyolefin explained in the above can be used. The polyolefin may be composed of one type of polyethylene, or may be a polyolefin composition containing multiple types of polyolefins.

As the plasticizer used in the kneading step of (1), it may be the one conventionally used in the polyolefin microporous membrane, and includes, for example, a phthalate ester, such as dioctyl phthalate (hereinafter, it may be abbreviated as "DOP"), diheptyl phthalate, or dibutyl phthalate; an organic acid ester other than the phthalate ester, such as an adipate ester and a glycerate ester; a phosphate ester, such as a trioctyl phosphate; liquid paraffin; solid wax; and mineral oil. These may be used alone, or in combination of two or more types. Among these, the phthalate ester is particularly preferable, in consideration of compatibility with polyethylene.

In the kneading step of (1), a kneaded product may be formed by kneading the polyolefin and the plasticizer, or the kneaded product may be formed by kneading the polyolefin, the plasticizer and the fillers. As the fillers used in the latter case, at least either of an organic fine particle and an inorganic fine particle can also be used.

The organic fine particle includes, for example, a modified polystyrene fine particle and a modified acrylic acid resin particle.

The inorganic particle includes, for example, oxide type ceramics, such as alumina, silica (silicon oxide), titania, zirconia, magnesia, ceria, yttria, a zinc oxide, and an iron oxide; nitride type ceramics, such as a silicon nitride, a titanium nitride, and a boron nitride; ceramics, such as a silicon carbide, a calcium carbonate, an aluminum sulfate, an aluminum hydroxide, a potassium titanate, talc, kaolinclay, kaolinite, halloysite, pyrophyllite, montmorillonite, sericite, mica, amesite, bentonite, asbestos, zeolite, a calcium silicate, a magnesium silicate, diatomaceous earth, or silica sand; and a glass fiber.

A blend ratio of the polyolefin, the plasticizer and the fillers used as needed, in the kneading step of (1), is not particularly limited. The ratio of polyolefin occupying in the kneaded product is preferably 25 to 50% by mass, from the viewpoint of strength of the resulting microporous membrane and membrane forming property. The ratio of the plasticizer occupying in the kneaded product is preferably 30 to 60% by mass, from the viewpoint of obtaining the viscosity suitable for extrusion. The ratio of the fillers occupying in the kneaded product is preferably 10% by mass or more, from the viewpoint of enhancing uniformity of pore size of the resulting microporous membrane, and is preferably 40% by mass or less, from the viewpoint of membrane forming property.

Into the kneaded product, there may be mixed various additives, as needed further, such as an antioxidant, such as a phenol-based antioxidant, such as pentaerythrityl-tetrakis-[3-(3,5-di-t-butyl-4-hydroxyphenyl)propionate], a phosphorus-based antioxidant, or a sulfur-based antioxidant; metallic soap, such as calcium stearate, or zinc stearate; an ultraviolet absorber; a light stabilizer; an antistatic agent; an antifogging agent; and a coloring pigment.

A kneading method in the kneading step of (1) is not particularly limited, and it may be a conventionally used method. For example, as the order of kneading, a portion of the polyolefin, the plasticizer and the fillers used as needed, may be mixed in advance, using a general mixing machine, such as a Henschel mixer, a V-blender, a ProShare mixer, or a ribbon blender, and then the mixture may be kneaded further together with the remaining raw materials; or all raw materials may be kneaded at the same time.

Equipment used in kneading is not particularly limited, and kneading can be carried out using, for example, melt kneading apparatus, such as an extruder, or a kneader.

The sheet forming step of (2) is a step, for example, for extruding the above-described kneaded product to sheet form via for example a T-die, and then cooling and solidifying the extruded substance by making it contacted with a thermal conductor. As the thermal conductor, a metal, water, air, and the plasticizer itself can be used. It is preferable to carry out cooling and solidifying by nipping the extruded substance between a pair of rolls, from the viewpoint of increasing membrane strength of the resulting sheet-like molded substance, and from the viewpoint of enhancing surface smoothness of the sheet-like molded substance.

The stretching step of (3) is a step for obtaining a stretched sheet by stretching a sheet (the sheet-like molded body) obtained through the sheet forming step. A stretching method in the stretching step includes MD uniaxial stretching by a roll stretching machine; TD uniaxial stretching by a tenter; sequential biaxial stretching by a combination of the roll stretching machine and the tenter, or by a combination of the tenter and the tenter; and simultaneous biaxial stretching by a simultaneous biaxial tenter or an inflation molding. As for the stretching method of the sheet, simultaneous biaxial stretching is preferable, from the viewpoint of obtaining a more uniform membrane. A total surface area magnification in stretching is preferably eight times or more, more preferably fifteen times or more, and still more preferably thirty times or more, from the viewpoint of uniformity of membrane thickness, as well as balance of tensile strength, porosity and average pore size. At the total surface area magnification of 30 times or more, high strength of the microporous membrane is easily obtained. Stretching temperature is preferably 121° C. or higher, from the viewpoint of furnishing high permeability and low contractibility at high temperature, and preferably 135° C. or lower, from the viewpoint of membrane strength.

Extraction prior to stretching in the stretching step of (3), or heat treatment in the post-processing step of (4), is carried out by a method for immersing the sheet or the stretched sheet into an extraction solvent, or for showering the extraction solvent onto the sheet or the stretched sheet. It is preferable that the extraction solvent is a poor solvent for a polyolefin, and a good solvent for a plasticizer and fillers. It is preferable that a boiling point of the extraction solvent is lower than melting point of the polyolefin. These extraction solvents include, for example, a hydrocarbon, such as n-hexane and cyclohexane; a halogenated hydrocarbon, such as methylene chloride, 1,1,1-trichloroethane and fluorocarbon; an alcohol, such as ethanol and isopropanol; ketones, such as acetone and 2-butanone; and alkaline water. The extraction solvents may be used alone or may be used in combination of two or more types.

The fillers may be extracted as a whole or a part thereof in any of the steps, or may remain in the microporous membrane obtained finally. The order, the method and the number of times of the extraction are not particularly limited.

A heat treatment method in the post-processing step of (4) includes a heat setting method for carrying out stretching and/or relaxation operation at predetermined temperature to the stretched sheet obtained through the stretching step, using a tenter and/or a roll stretching machine. The relaxation operation is a reduction operation carried out by predetermined relaxation rate in the MD and/or the TD of the membrane. The relaxation rate is a value of the MD dimension of the membrane after the relaxation operation divided by the MD dimension of the membrane before the relaxation operation; or a value of the TD dimension of the membrane after the relaxation operation divided by the TD dimension of the membrane before the operation; or a multiplied value of the relaxation rate of the MD and the relaxation rate in the TD, in the case where relaxation is carried out in both the MD and the TD. The above-described predetermined temperature is preferably 130° C. or lower, and more preferably 123° C. or lower, from the viewpoint of control of pore content ratio or control of ion diffusion resistance. On the other hand, the above-described predetermined temperature is preferably 115° C. or higher, from the viewpoint of stretching property. It is preferable to stretch the stretched sheet by 1.5 times or more toward the TD, and more preferably by 1.8 times or more toward the TD, at the post processing step, from the viewpoint of thermal shrinkage and permeability. It is preferable to stretch the stretched sheet by 6.0 times or less toward the TD, from the viewpoint of safety, and more preferably by 4.0 times or less, from the viewpoint of maintaining balance of membrane strength and permeability. The predetermined relaxation rate is preferably 0.9 times or less, from the viewpoint of inhibition of thermal shrinkage, and more preferably 0.6 times or more, from the viewpoint of prevention of wrinkle generation, pore content ratio and permeability. The relaxation operation may be carried out to both directions of the MD and the TD, or may be the relaxation operation in only one direction of either of the MD and the TD. Even the relaxation operation in only one direction of either of the MD and the TD, it is possible to reduce the thermal shrinkage not only in the operation direction but also in the other direction.

The coating step of (5) can include a method for forming a porous layer by coating of coating liquid containing the insulating particles and the resin binder onto at least one-side of the porous membrane having the polyolefin resin as a main component, followed by drying.

As a solvent of the coating liquid, it is preferable the solvent which is capable of uniformly and stably dispersing or dissolving the insulating particle and the resin binder, and includes, for example, N-methylpyrrolidone, N,N-dimethylformamide, N,N-dimethylacetamide, water, ethanol, toluene, hot xylene, methylene chloride, and hexane.

A concentration of the coating liquid ((mass of the insulating particle+ mass of the resin binder)×100/mass of the coating liquid) is preferably 10 to 90%, more preferably 15 to 80%, and still more preferably 20 to 70%. At the concentration of the coating liquid of 90% or lower, thin membrane coating is easy because viscosity can be lowered. On the other hand, at the concentration of the coating liquid of 10% or higher, drying time is short and adjustment of membrane thickness is easily carried out.

Into the coating liquid, various additives, such as a dispersant of a surfactant, etc.; a thickener; a moistening agent; an antifoam agent; a pH adjuster containing an acid or an alkali, may be added, to stabilize dispersion or to enhance coating property. As these additives, those capable of being removed in solvent removal are preferable. However, they may remain within the porous layer, as long as they are electrochemically stable, not inhibiting a battery reaction, in a use range of a lithium ion secondary battery or the capacitor, and stable up to about 200° C.

A method for dispersing or dissolving the insulating particles and the resin binder in a solvent of the coating liquid, is not particularly limited, as long as it is a method capable of attaining dispersing characteristic of the coating liquid, necessary in the coating step. It includes, for example, mechanical agitation, such as using a ball mill, a bead mill, a planetary ball mill, a vibratory ball mill, a sand mill, a colloid mill, an attritor, a roll mill, a high speed impeller, a disperser, a homogenizer, a high speed impact mill, an ultrasonic dispersion, or an impeller.

A method for coating the coating liquid onto the porous membrane is not particularly limited, as long as it is a method capable of attaining required membrane thickness or coating area, and includes, for example, a gravure coater method, a small diameter gravure coater method, a reverse roll coater method, a transfer roll coater method, a kiss coater method, a dip coater method, a knife coater method, an air doctor coater method, a blade coater method, a rod coater method, a squeeze coater method, a cast coater method, a die coater method, a screen printing method, or a spray coating method.

A method for removing a solvent from the coated membrane after coating is not particularly limited, as long as it is a method that does not adversely affect the porous membrane. It includes, for example, a method for drying at the melting temperature or lower of the porous membrane, under a fixed state; or a method for drying under reduced pressure at low temperature.

The production method of the separator can have a step for laminating multiple sheets of the single layer body, as a step for obtaining the laminate, in addition to each step of the above-described (1) to (5). The production method may have a step for applying the surface treatment, such as electron beam irradiation, plasma irradiation, surfactant coating and chemical modification, to the polyolefin porous membrane and the insulating porous layer.

<Capacitor>

The capacitor of the present invention can be prepared by a method for preparing an electrode laminate, where the positive electrode body and the negative electrode body are laminated through the separator, mounting the casing, such as a laminate film, to the electrode laminate, drying by heating it using a dryer set at temperature of heat resistant temperature or less of the separator, and charging the electrolytic solution. Alternatively, there may be adopted such a method for drying by heating the above-described electrode laminate in advance, and then mounting the casing and charging the electrolytic solution; or a method for drying by heating each electrode body and the separator individually, before they are wound or laminated, and then preparing the electrode laminate, mounting the casing, and injecting the electrolytic solution. It is more preferable to dry by heating under reduced pressure condition, because drying time can be shortened. In the capacitor of the present invention, the separator is laminated so that the insulating porous membrane side of the separator faces to the negative electrode body. For example, in the case of using the separator explained above in the capacitor of the present invention, it may be dried by heating at 80° C. By setting at such temperature condition, drying is possible by heating the electrode laminated body before injecting the electrolytic solution without making the pores clogged, which are opened in the separator, and reliability can be enhanced while maintaining output characteristic of the capacitor. Reasons for the capacitor to enhance reliability by heating and drying the electrode laminated body before injecting the solution are not clear; however, it is believed that the amount of moisture contained in the positive electrode or the negative electrode can be lowered.

It is preferable that the capacitor of the present invention has a static capacitance of 100 F or more. At the static capacitance of 100 F or more, amount of electricity stored by the capacitor is high. Therefore, in the case of short circuiting, a function for carrying out the short circuiting safely and instantaneously, which the capacitor of the present invention has, is more effective.

At the static capacitance of 5000 F or less, a cell can be prepared efficiently, and thus it is preferable.

The non-aqueous electrolytic solution to be used in the capacitor of the present invention may be the non-aqueous fluid having a lithium ion-containing electrolyte. Such a non-aqueous fluid may contain a solvent, and as such a solvent, there can be used, for example, a cyclic carbonate ester represented by ethylene carbonate (EC) and propylene carbonate (PC); a chained carbonate ester represented by diethyl carbonate (DEC), dimethyl carbonate (DMC), and methyl ethyl carbonate (MEC); lactones, such as γ-butyrolactone (γBL) and mixed solvents thereof.

As the salt dissolved in these solvents, a lithium salt, such as $LiBF_4$ or $LiPF_6$, can be used. It is preferable that salt concentration of the electrolytic solution is in a range of 0.5 to 2.0 mol/L. At the concentration of 0.5 mol/L or more, an anion is present sufficiently and capacitance of the capacitor is maintained. On the other hand, at the concentration of 2.0 mol/L or less, the salt is dissolved sufficiently in the electrolytic solution, and suitable viscosity and electric conductivity of the electrolytic solution are maintained.

In the electrode laminate, one end of a positive electrode terminal is electrically connected to the positive electrode body, and one end of a negative electrode terminal is electrically connected to the negative electrode body. Specifically, the positive electrode terminal is electrically connected to the non-coated region of the positive electrode active material layer of the positive electrode collector, and the negative electrode terminal is electrically connected to the non-coated region of the negative electrode active material layer of the negative electrode collector. It is preferable that a material of the positive electrode terminal is aluminum, and a material of the negative electrode terminal is a nickel plated copper.

The electrode terminal generally has a nearly rectangular shape, and one end thereof is electrically connected to the collector of the electrode laminate, and the other end is electrically connected to outer load (in the case of discharging) or a power source (in the case of charging), during use. It is a preferable aspect that a film made of a resin of polypropylene, etc., is pasted at the center part of the electrode terminal, which is a sealed part of the laminate film casing, to prevent short circuit of the electrode terminal and the metal foil constituting the laminate film, and also enhance sealing tightness.

The above-mentioned electrical connection method of the electrode laminate and electrode terminal, for example, an ultrasonic welding method is generally used, however, resistance welding, or laser welding, may be accepted, and it is not particularly limited.

It is preferable that the laminate film used in the casing is a film where a metal foil and a resin film are laminated, and the film having three-layer constitution consisting of an outer layer resin film/a metal foil/an inner layer resin film is exemplified. The outer layer resin film is the film for preventing the metal foil from receiving damage caused by contact, etc., and a resin, such as nylon or a polyester, can be suitably used. The metal foil is the foil for preventing permeation of moisture or gas, and a foil of copper, aluminum, or stainless steel, can be used suitably. The inner layer resin film is the film for protecting the metal foil from the electrolytic solution stored inside, as well as for melt sealing in heat sealing, and for example, a polyolefin, or an acid modified polyolefin, can be used suitably.

EXAMPLE

Explanation on the present invention will be given below specifically with reference to Examples and Comparative Examples; however, the present invention should not be limited thereto. Various properties of the polyolefin microporous membrane, the insulating porous membrane and the separator were measured by the following methods:
(1) Viscosity Average Molecular Weight (Mv)

2,6-di-t-butyl-4-methylphenol was dissolved into decahydronaphthalene so as to attain a concentration of 0.1% by mass, to prevent deterioration of a sample, and this (hereinafter, abbreviated as "DHN") was used as a solvent for the sample. A sample solution was obtained by dissolving the sample into DHN at 150° C., so as to attain a concentration of 0.1% by mass. 10 mL of the sample solution was sampled to measure time in seconds (t) required to pass through between marked lines at 135° C., using the Cannon-Fenske viscometer (SO100). In addition, after heating DHN at 150° C., 10 mL thereof was sampled to measure time in seconds ($t_B$) required to pass through between marked lines of the viscometer by a similar method. Limiting viscosity [η] was calculated by the following conversion formula, using the resulting pass through time in seconds t and $t_B$.

$$[\eta]=((1.651t/t_B-0.651)^{0.5}-1)/0.0834$$

Viscosity average molecular weight (Mv) was calculated from [η] determined. Mvs of the raw material polyethylene, the raw material polyolefin composition and the microporous membrane were calculated by the following formula.

$$[\eta]=6.77\times10^{-4}Mv^{0.67}$$

Mv of the raw material polypropylene was calculated by the following formula.

$$[\eta]=1.10\times10^{-4}Mv^{0.80}$$

(2) Thickness

Thickness of the polyolefin porous membrane and total thickness of the separator were measured at an ambient temperature of 23±2° C., using KBM (trade name), which is a minute thickness gauge, manufactured by Toyo Seiki Kogyo, Co., Ltd. As thickness of the insulating porous layer, a value obtained by subtracting the thickness of the polyolefin porous membrane from the total thickness of the separator was used.
(3) Porosity of Polyolefin Porous Membrane (%)

A sample with a square size of 10 cm×10 cm was cut out from the polyolefin porous membrane to determine volume ($cm^3$) and mass (g) thereof, and the porosity was calculated from them and membrane density ($g/cm^3$), using the following formula.

$$\text{Porosity}=(\text{volume-mass/membrane density})/\text{volume}\times 100$$

The membrane density was calculated from fraction of composition, provided that density of polyethylene is 0.95 and density of polypropylene is 0.91. As various membrane densities, density determined by a density gradient tube method of JISK-7112 can also be used.
(4) Piercing Strength (g)

A piercing test was carried out at an ambient temperature of 23±2° C., with a radius of curvature of a needle tip of 0.5 mm and a piercing speed of 2 mm/sec, using KES-G5 (trade name), which is a handy-type compression test apparatus, manufactured by Kato Tech Co., Ltd. Maximum piercing load (g) was measured, which value was adopted as the piercing strength.
(5) Thermal Shrinkage (%)

A sample specimen was cut out in a size of 100×50 mm, in matching to each measuring directions of the MD and the TD. Each length of the MD and the TD was measured at room temperature, after holding that sample specimen in an oven at 100° C. for 1 hour in an unconstrained state. Thermal shrinkage is given by ((length before heating)−(length after heating))×100/(length before heating).
(6) Pore Size (μm) and Number of Pores (Number/$\mu m^2$) of Polyolefin Porous Membrane It is known that the fluid inside of the capillary acts as a Knudsen flow, when the mean free path of fluid is larger than pore size of the capillary; and it acts as a Poiseuille flow, when it is smaller. Accordingly, it is assumed that air flow in air permeability measurement of the microporous membrane acts as a Knudsen flow, and water flow in water permeability measurement of the porous membrane acts as a Poiseuille flow.

In this case, pore size d (μm) and tortuosity ratio $\tau_a$ (dimensionless) of the porous membrane can be determined, using the following formulas, from permeation rate constant of air $R_{gas}$ ($m^3/(m^2\cdot sec\cdot Pa)$), permeation rate constant of water $R_{liq}$ ($m^3/(m^2\cdot sec\cdot Pa)$), molecular speed of air ν (m/sec), viscosity of water η (Pa·sec), standard pressure $P_s$ (=101325 Pa), porosity ε (%), and membrane thickness L (μm).

$$d=2\nu\times(R_{liq}/R_{gas})\times(16\eta/3P_s)\times10^6$$

$$\tau_a=(d\times(\varepsilon/100)\times\nu/(3L\times P_s\times R_{gas}))^{1/2}$$

Here, $R_{gas}$ is determined from air permeability (sec), using the following formula.

$$R_{gas}=0.0001/(\text{air permeability}\times(6.424\times10^{-4})\times(0.01276\times101325))$$

In addition, $R_{liq}$ is determined from water permeability ($cm^3/(cm^2 \cdot sec \cdot Pa)$), using the following formula.

$$R_{liq} = \text{water permeability}/100$$

Water permeability is determined as follows. A porous membrane, which had been immersed in alcohol in advance, was set in a liquid permeation cell made of stainless steel having a diameter of 41 mm, and after cleaning the alcohol of the membrane with water, water was permeated through by a pressure difference of about 50000 Pa, and water permeation amount per unit time, unit pressure, and unit area was calculated from water permeation amount ($cm^3$) passed through during 120 seconds, and this value was used as water permeability.

$v$ can be determined from gas constant R (=8.314), absolute temperature T (K), circular constant $\pi$, and average molecular weight of air M (=$2.896 \times 10^{-2}$ kg/mol), using the following formula.

$$v = ((8R \times T)/(\pi \times M))^{1/2}$$

Number of pores B (pores/$\mu m^2$) is determined by the following formula.

$$B = 4 \times (\varepsilon/100)/(\pi \times d^2 \times \tau_a)$$

(7) Brugmann Index of Separator
<Only Polyolefin Porous Membrane>

Diffusion coefficient (D) of methyl ethyl carbonate impregnated in the separator in the direction of membrane thickness at 30° C. was calculated, by a Pulsed Field Gradient Nuclear Magnetic Resonance method (PFG-NMR method), using ECA400, manufactured by JEOL Ltd. The separator was punched out to a diameter of 3.5 mm, and impregnated with methyl ethyl carbonate, and stacked so as to attain a height of 5 mm, in an NMR symmetric micro test tube, to carry out measurement of PFG-NMR at 30° C. For NMR sequence, a bpp-led-DOSY method was used. In diffusion coefficient D and measurement parameters, the following equation holds: $\ln(E/E_0) = -D \times \gamma 2 \times g 2 \times \delta 2 \times (\Delta - \delta/3)$ (here, E: peak intensity at each measurement point, $E_0$: peak intensity in the case of not providing PFG, $\gamma$:gyromagnetic ratio of a nuclear spin, $\delta$:PFG irradiation time, g:PFG intensity, and $\Delta$:diffusion time). The plotting was carried out by changing g at 10 or more points, provided that Y axis is $\ln(E/E_0)$ and X axis is $\gamma 2 \times g 2 \times \delta 2 \times (\Delta - \delta/3)$, and then by carrying out linear approximation of the plot in a region where $\ln(E/E0)$ is 0 to −2, D was calculated from inclination thereof. $\Delta$, $\delta$ and g are arbitrary variables; however, $\Delta$ should satisfy the following condition.

Average pore size of the separator $< 2 \times (\varepsilon \times D \times \Delta)^{1/2}$ Next, the Brugmann index was calculated from $\varepsilon \times D = \varepsilon \alpha \times D_0$ ($\varepsilon$ represents porosity of the membrane, $D_0$ represents diffusion coefficient of methyl ethyl carbonate at 30° C. in free space, and $\alpha$ represents the Brugmann index).

<Polyolefin Porous Membrane+Insulating Porous Membrane>

Diffusion coefficient (D) of methyl ethyl carbonate impregnated in the resulting separator in the membrane thickness direction at 30° C. was calculated, by a Pulsed Field Gradient Nuclear Magnetic Resonance method (PFG-NMR method), using ECA400, manufactured by JEOL Ltd. The separator was punched out to a diameter of 3.5 mm, and impregnated with methyl ethyl carbonate, and stacked so as to attain a height of 5 mm in an NMR symmetric micro test tube, to carry out measurement of PFG-NMR at 30° C. For NMR sequence, a bpp-led-DOSY method was used. In diffusion coefficient D and measurement parameters, the following equation holds: $\ln(E/E_0) = -D \times \gamma 2 \times g 2 \times \delta 2 \times (\Delta - \delta/3)$ (here, E: peak intensity at each measurement point, $E_0$: peak intensity in the case of not providing PFG, $\gamma$:gyromagnetic ratio of a nuclear spin, $\delta$:PFG irradiation time, g:PFG intensity, and $\Delta$:diffusion time). The plotting was carried out by changing g at 10 or more points, provided that Y axis is $\ln(E/E_0)$ and X axis is $\gamma 2 \times g 2 \times \delta 2 \times (\Delta - \delta/3)$, and then by carrying out linear approximation of the plot in a region where $\ln(E/E0)$ is 0 to −2, D was calculated from inclination thereof. $\Delta$, $\delta$ and g are arbitrary variables; however, $\Delta$ should satisfy the following condition.

Average pore size of the separator $< 2 \times (\varepsilon \times D \times \Delta)^{1/2}$ In the case where the separator is a laminated porous membrane of the polyolefin porous membrane and the insulating porous membrane, methyl ethyl carbonate in the polyolefin porous membrane, and methyl ethyl carbonate in the insulating porous membrane are detected as separate peaks in the PFG-NMR method. Accordingly, diffusion coefficient of methyl ethyl carbonate in the polyolefin porous membrane in membrane thickness direction at 30° C., and diffusion coefficient in membrane thickness direction at 30° C. of methyl ethyl carbonate in the insulating porous membrane are calculated by carrying out linear approximation of the above-described plot as for each peak.

Next, the Brugmann index was calculated from $L1/(L1+L2) \times \varepsilon 1 \leq D1 + L2/(L1+L2) \times \varepsilon 2 \times D2 = (L1/(L1+L2) \times \varepsilon 1 + L2/(L1+L2) \times \varepsilon 2) \alpha \times D_0$ (L1: membrane thickness of the polyolefin porous membrane, L2: membrane thickness of the insulating porous membrane, $\varepsilon 1$: porosity of the polyolefin porous membrane, $\varepsilon 2$: porosity of the insulating porous membrane, D1: diffusion coefficient of methyl ethyl carbonate in the polyolefin porous membrane in membrane thickness direction at 30° C., D2: diffusion coefficient of methyl ethyl carbonate in the insulating porous membrane in membrane thickness direction at 30° C., D0: diffusion coefficient of methyl ethyl carbonate in free space at 30° C., and $\alpha$: the Brugmann index).

(8) Average particle size (Dp50) of inorganic fillers

Particle size (Dp50), where accumulated frequency is 50%, was adopted as the average particle size ($\mu$m), by measurement of particle size distribution using a laser-type particle size distribution measurement apparatus (Micro track MT3300EX, manufactured by Nikkiso Co., Ltd), by adding the inorganic fillers in distilled water, and adding small amount of an aqueous solution of sodium hexametaphosphate, followed by dispersing them for 1 min., using an ultrasonic homogenizer.

Example 1

[Preparation of Positive Electrode Body]

Crushed carbonized coconut shell was subjected to carbonization in a small carbonization furnace in nitrogen at 500° C. for 3 hours. The carbonized product after processing was put in an activation furnace, and steam was charged into the activation furnace, in a rate of 1 kg/h, in a heated state in a preheating furnace, and it was taken out after increasing temperature up to 900° C. taking 8 hours, followed by cooling under nitrogen atmosphere, to obtain an activated carbon. The resulting activated carbon was washed with flowing water for 10 hours, and then drained. After that, it was dried in an electric drying oven maintained at 115° C., for 10 hours, and then pulverized using a ball mill for 1 hour to obtain activated carbon 1. Measurement result of average particle size, using a laser diffraction particle size distribution analyzer (SALD-2000J), manufactured by Shimadzu Corp., was 4.2 $\mu$m. Pore distribution was measured using a fine pore distribution measuring apparatus (AUTOSORB-1 AS-1-MP), manufactured by Yuasa Ionics Co., Ltd. As a result, BET specific surface area was 2360 m²/g, the mesopore volume (V1) was 0.52 cc/g, and the micro-pore volume (V2) was 0.88 cc/g.

Slurry was obtained by mixing 80.8 parts by mass of the activated carbon 1, 6.2 parts by mass of Ketjen black, 10 parts by mass of PVDF (polyfluorovinilidene), 3.0 parts by mass of PVP (polyvinylpyrrolidone), and NMP (N-methylpyrrolidone). Next, the resulting slurry was coated onto one-side of an aluminum foil with a thickness of 15 μm, dried and pressed to obtain the one-side positive electrode body having a thickness of the active material layer of 55 μm. Similarly, the slurry was coated onto both-sides of the aluminum foil, dried and pressed to obtain the both side positive electrode body.

[Preparation of Negative Electrode Body]

Distribution of a commercial coconut shell activated carbon was measured using nitrogen as an adsorbate, and using a fine pore distribution measuring apparatus (AUTOSORB-1 AS-1-MP), manufactured by Yuasa Ionics Co., Ltd. Specific surface area was determined by BET one point method. The mesopore volume and the micropore volume were determined by the BJH method and the MP method, respectively, as mentioned above, using an isotherm at the desorption side. As a result, BET specific surface area was 1,780 m²/g, the mesopore volume was 0.198 cc/g, the micro-pore volume was 0.695 cc/g, V1/V2=0.29, and average pore size was 21.2 Å.

150 g of this coconut shell activated carbon was put in a cage made of a stainless steel mesh, and it was put on a stainless steel bat including 270 g of coal-based pitch (softening point: 50° C.), and it was then laid in an electric furnace (usable inside dimension of the furnace: 300 mm×300 mm×300 mm), to carry out a thermal reaction. Heat treatment was carried out under nitrogen atmosphere, and by increasing temperature up to 600° C. taking 8 hours, maintaining at the same temperature for 4 hours, and subsequently cooling down to 60° C. by natural cooling, it was then taken out of the furnace to obtain a composite porous material 1 as a negative electrode material. As for the resulting composite porous material 1, measurement was carried out similarly as in the above-described activated carbon 1, and BET specific surface area was 262 m²/g, the mesopore volume (Vm1) was 0.1798 cc/g, the micro-pore volume (Vm2) was 0.0843 cc/g, and Vm1/Vm2=2.13.

Slurry was obtained by mixing 83.4 parts by mass of the above-described composite porous material 1, 8.3 parts by mass of acetylene black, 8.3 parts by mass of PVDF (polyfluorovinilidene), and NMP (N-methylpyrrolidone). The resulting slurry was coated onto both-sides of an expanded copper foil, dried and pressed to obtain a negative electrode body having a thickness of the negative active substance layer of 60 μm. A lithium metal foil, equivalent to 760 mAh/g per unit weight of the composite porous material 1, was pasted to one-side of this both side negative electrode body.

[Preparation of Separator]

Separator 1

Homopolymers of polyethylene having My of 250,000 and 700,000 as a pure polymers, were prepared in each ratio of 50:50 by weight. By adding 1.0% by mass of pentaerythrityl-tetrakis-[3-(3,5-di-t-butyl-4-hydroxyphenyl)propionate], as an antioxidant, to 99% by mass of the above-described pure polymers, and by dry-blending them using a tumbler-blender, a mixture of the polymers, etc., was obtained. The resulting mixture of the polymer, etc., was supplied into a twin-screw extruder, whose inside was replaced with nitrogen, by a feeder under nitrogen atmosphere. Liquid paraffin, as a plasticizer, was injected into a cylinder of the extruder by a plunger pump. Melt kneading was carried out using the twin-screw extruder, and the feeder and the pump were adjusted so that an amount ratio of liquid paraffin occupying in the whole extruded mixture is 68% by mass (i.e., amount ratio of the mixture of the polymers, etc., is 32% by mass). Melt kneading conditions were: a setting temperature of 200° C., a screw rotation of 100 rpm, and a discharge quantity of 12 kg/h.

Subsequently, by extruding and casting the obtained melt kneaded product on a cooling roll controlled at a surface temperature of 40° C., via a T-die, a gel sheet having a thickness of 1600 μm was obtained.

Next, the resulting gel sheet was introduced to a simultaneous biaxial tenter stretching machine to carry out biaxial stretching to obtain a stretched sheet. Stretching conditions set were: a stretching ratio in the MD of 7.0 times, a stretching ratio in the TD of 6.1 times, and a set temperature of 121° C.

Then, the stretched sheet was introduced into a methyl ethyl ketone tank to sufficiently immerse into methyl ethyl ketone, and liquid paraffin was removed by extraction from the stretched sheet and then methyl ethyl ketone was removed by drying.

Next, the stretched sheet, from which methyl ethyl ketone was removed by drying, was introduced to a TD tenter to carry out heat setting. Heat setting temperature was set at 121° C., TD maximum magnification was set at 2.0 times, and relaxation rate was set at 0.90 times. The resulting polyolefin porous membrane had a thickness of 16 μm, a porosity of 65%, a pore size of 0.05 μm, and a number of pores of 190 pores/μm².

Next, the insulating porous membrane having a thickness of 5 μm, was formed on the polyolefin porous membrane by coating the coating liquid dispersed with insulating alumina particles, onto one-side of the resulting polyolefin porous membrane, using a micro gravure coater, followed by drying at 60° C. The coating liquid was prepared by uniformly dispersing 96.0 parts by mass of alumina having particle size adjusted using a beads mill, so as to attain an average particle size (Dp50) of 1.0 μm, 4.0 parts by mass of acryl latex (a solid content concentration of 40%, an average particle size of 145 nm), as the resin binder, and 1.0 part by mass of an aqueous solution of ammonium polycarboxylate (SN dispersant 5468, manufactured by SAN NOPCO Ltd.), into 100 parts by mass of water.

Evaluation results of various characteristics of the microporous membrane separator 1 obtained in this way are shown in following Table 1, together with composition thereof.

[Preparation of Electrolytic Solution]

A solution obtained by dissolving LiPF$_6$ in a concentration of 1 mol/l into a solvent, where ethylene carbonate (EC) and methyl ethyl carbonate (MEC) were mixed in a volume ratio of 1 to 4, was used as the electrolytic solution.

[Assembly of Capacitor]

The resulting one-side positive electrode body, both-sides positive electrode body and both-sides negative electrode body were cut into 100 mm×100 mm. Next, using the one-side positive electrode bodies at the uppermost surface and the undermost surface, and at the intermediate part, by laminating 20 sheets of the both-sides negative electrode body and 19 sheets of the both-sides positive electrode body, alternately through the microporous membrane separator 1, and then by connecting electrode terminals to the negative electrode body and the positive electrode body, an electrode laminate was obtained. This electrode laminate was inserted into a casing consisting of a laminate film, and the above-described electrolytic solution was injected in a state that the end parts of the electrode terminals were pulled out, to seal the casing, and thus a lithium ion capacitor was assembled.

[Characteristics Evaluation]

Characteristics evaluation of the capacitor prepared was carried out under an environment of 25° C. Charging was carried out up to 4.0 V at a current value of 1 C, and then constant current and constant voltage charging was carried out for 2 hours, where a constant voltage of 4.0 V was applied. Subsequently, it was discharged down to 2.0 V at a current value of 1 C. Next, the same charging as above was carried out for 2 hours, and then discharged down to 2.0 V at a current value of 300 C. Ratio of discharge capacitance at 300 C relative to discharge capacitance at 1 C was 78%. Next, characteristics evaluation was carried out under an environment of −20° C. Charging similar to the above was carried out, and discharged down to 2.0 V at a current value of 200 C. Ratio of discharge capacitance at −20° C. at 200 C relative to discharge capacitance at 25° C. at 1 C was 49%.

A cycle test was further carried out, as a durability test, by subjecting the capacitor prepared to repeated charging at constant current and discharging at constant current at a current amount of 300 C, and a voltage width of 1 cycle of from 2.0 V to 4.0 V at 25° C. Capacitance retention rate after 100,000 cycles elapsed relative to test start time (at 10th cycle), at a current amount of 300 C, was measured. The capacitance retention rate is numerical value represented by {(discharge capacitance after 100,000 cycles elapsed)/(discharge capacitance at 10th cycle)}×100. Capacitance retention rate after 100,000 cycles elapsed was 88%.

[Nail Penetration Test]

Testing machine: Shimadzu Autograph AG-X
Nail: φ2.5 mm-SUS304

Figure 2:
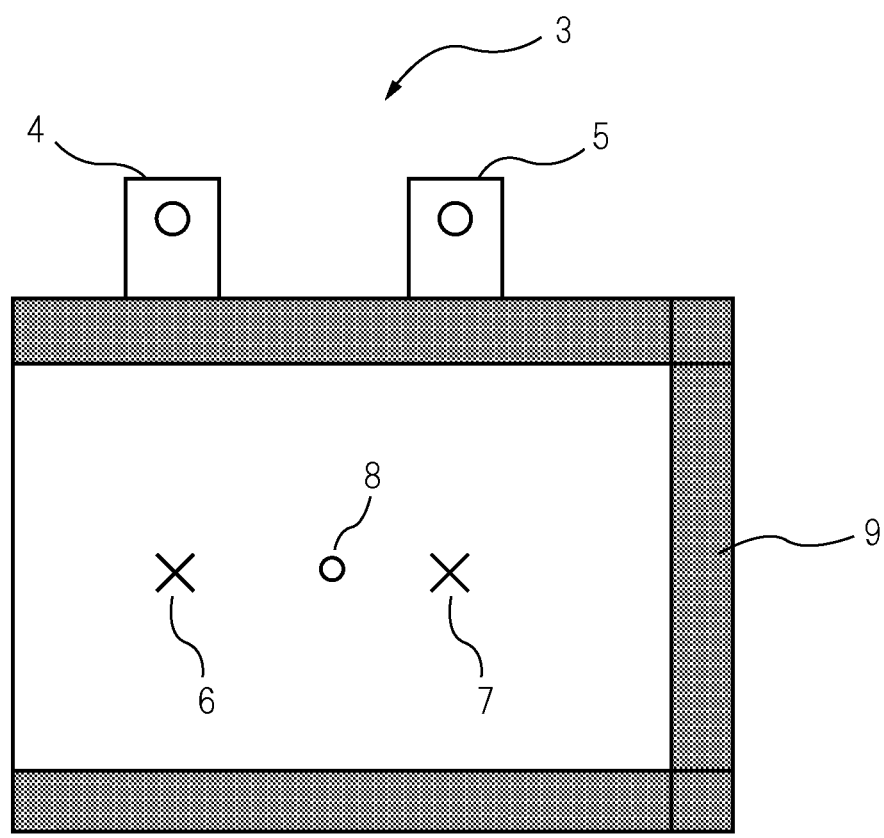
FIG. 2 is a schematic plan view of a cell in a nail penetration test.

On evaluation (FIG. 2): As shown in FIG. 2, by fixing the cell (3) horizontally, the nail was penetrated so as to pierce the cell at a rate of 10 mm/sec, at the nail penetration position (8) in the center part of the cell, followed by measuring temperature using a thermocouple pasted at the temperature measurement positions (6, 7) of the surface of a laminate, to determine maximum temperature thereof. Amount of gas and smoke generated was observed, and an unsealing state of the capacitor was observed. Results are shown in following Table 1. In FIG. 2, an electrode body or an electrolytic solution is not included at the heat seal part (9).

Example 2

[Preparation of Positive Electrode Body]
It was prepared similarly as in Example 1.
[Preparation of Negative Electrode Body]
It was prepared similarly as in Example 1.
[Preparation of Separator]
Separator 2

Separator 2 was prepared by a similar method as in Example 1, except for using titania, whose particle size was adjusted by a beads mill, so as to attain an average particle size (Dp50) of 2.0 μm, instead of the insulating alumina particle. Evaluation results of various characteristics of the microporous membrane separator 2 obtained in this way are shown in Table 1, together with composition thereof.
[Preparation of Electrolytic Solution]
It was prepared similarly as in Example 1.
[Assembly of Capacitor]

A lithium ion capacitor was assembled under similar condition as in Example 1, using the resulting microporous membrane separator 2.

[Characteristics Evaluation]

Characteristics evaluation of the capacitor prepared was carried out under an environment of 25° C. Charging was carried out up to 4.0 V at a current value of 1 C, and then constant current and constant voltage charging was carried out for 2 hours, where a constant voltage of 4.0 V was applied. Subsequently, it was discharged down to 2.0 V at a current value of 1 C. Next, the same charging as above was carried out for 2 hours, and then discharged down to 2.0 V under a current value of 300 C. Ratio of discharge capacitance under 300 C relative to discharge capacitance under 1 C was 79%. Next, characteristics evaluation was carried out under an environment of −20° C. Charging similar to the above was carried out, and discharged down to 2.0 V at a current value of 200 C. Ratio of discharge capacitance at −20° C. at 200 C relative to discharge capacitance at 25° C. at 1 C was 48%.

A durability test was further carried out similarly as in Example 1, and as a result, capacitance retention rate after 100,000 cycles elapsed was 86%.
[Nail Penetration Test]

A nail penetration test was carried out by a similar method as in Example 1. Results obtained are shown in following Table 1.

Example 3

[Preparation of Positive Electrode Body]
It was prepared similarly as in Example 1.
[Preparation of Negative Electrode Body]
It was prepared similarly as in Example 1.
[Preparation of Separator]
Separator 3

Homopolymers of polyethylene having Mv of 250,000 and 700,000 as a pure polymer, were prepared in each ratio of 50:50 by weight. By adding 1.0% by mass of pentaerythrityl-tetrakis-[3-(3,5-di-t-butyl-4-hydroxyphenyl)propionate], as an antioxidant, to 99% by mass of the above-described pure polymers, and by dry-blending them using a tumbler-blender, a mixture of the polymers, etc., was obtained. The resulting mixture of the polymer, etc., was supplied into a twin-screw extruder, whose inside was replaced with nitrogen, by a feeder under nitrogen atmosphere. Liquid paraffin, as a plasticizer, was injected into a cylinder of the extruder by a plunger pump. Melt kneading was carried out using the twin-screw extruder, and the feeder and the pump were adjusted so that an amount ratio of liquid paraffin occupying in the whole extruded mixture is 65% by mass (i.e., amount ratio of the mixture of the polymers, etc. (PC), is 35% by mass). Melt kneading conditions were: a setting temperature of 200° C., a screw rotation of 100 rpm, and a discharge quantity of 12 kg/h.

Subsequently, by extruding and casting the obtained melt kneaded product on a cooling roll controlled at a surface temperature of 40° C., via a T-die, a gel sheet having a thickness of 2000 μm was obtained.

Next, the resulting gel sheet was introduced to a simultaneous biaxial tenter stretching machine to carry out biaxial stretching to obtain a stretched sheet. Stretching conditions set were: a stretching ratio in the MD of 7.0 times, a stretching ratio in the TD of 6.1 times, and a set temperature of 125° C.

Then, the stretched sheet was introduced into a methyl ethyl ketone tank to sufficiently immerse into methyl ethyl ketone, and liquid paraffin was removed by extraction from the stretched sheet and then methyl ethyl ketone was removed by drying.

Next, the stretched sheet, from which methyl ethyl ketone was removed by drying, was introduced to a TD tenter to carry out heat setting. Heat setting temperature was set at 133° C., TD maximum magnification was set at 1.8 times, and relaxation rate was set at 0.83 times. The resulting polyolefin porous membrane had a thickness of 16 μm, a porosity of 41%, a pore size of 0.085 μm, and a number of pores of 40 pores/μm$^2$.

Next, the insulating porous layer, having a thickness of 5 μm, was formed on the polyolefin porous membrane by coating the coating liquid dispersed with insulating alumina particles, onto one-side of the resulting polyolefin porous membrane, using a micro gravure coater, followed by drying at 60° C. The coating liquid was prepared by uniformly dispersing and dissolving 96.0 parts by mass of alumina having particle size adjusted using a beads mill, so as to attain an average particle size (Dp50) of 1.0 μm, 4.0 parts by mass of polyvinyl alcohol (an average polymerization degree of 1700, a saponification degree of 99% or more), as the resin binder, and 1.0 part by mass of an aqueous solution of ammonium polycarboxylate (SN dispersant 5468, manufactured by SAN NOPCO Ltd.), into 100 parts by mass of water.

Evaluation results of various characteristics of the microporous membrane separator 3 obtained in this way are shown in following Table 1, together with composition thereof.
[Preparation of Electrolytic Solution]
It was prepared similarly as in Example 1.
[Assembly of Capacitor]
A lithium ion capacitor was assembled under similar condition as in Example 1, using the resulting separator 3.
[Characteristics Evaluation]
Characteristics evaluation of the capacitor prepared was carried out under an environment of 25° C. Charging was carried out up to 4.0 V at a current value of 1 C, and then constant current and constant voltage charging was carried out for 2 hours, where a constant voltage of 4.0 V was applied. Subsequently, it was discharged down to 2.0 V at a current value of 1 C. Next, the same charging as above was carried out for 2 hours, and then discharged down to 2.0 V at a current value of 300 C. Ratio of discharge capacitance at 300 C relative to discharge capacitance at 1 C was 67%. Next, characteristics evaluation was carried out under an environment of −20° C. Charging similar to the above was carried out, and discharged down to 2.0 V at a current value of 200 C. Ratio of discharge capacitance at −20° C. at 200 C relative to discharge capacitance at 25° C. at 1 C was 28%.

A durability test was further carried out similarly as in Example 1, and as a result, capacitance retention rate after 100,000 cycles elapsed was 87%.
[Nail Penetration Test]
A nail penetration test was carried out by a similar method as in Example 1. Results obtained are shown in following Table 1.

Comparative Example 1

[Preparation of Positive Electrode Body]
It was prepared similarly as in Example 1.
[Preparation of Negative Electrode Body]
It was prepared similarly as in Example 1.
[Preparation of Separator]
Separator 4
The polyolefin porous membrane was used as the separator 4, without coating a mixture of the insulating particles and the resin binder onto polyolefin porous membrane obtained in Example 1. Evaluation results of various characteristics of the separator 4 are shown in following Table 1.
[Preparation of Electrolytic Solution]
It was prepared similarly as in Example 1.
[Assembly of Capacitor]
A lithium ion capacitor was assembled under similar condition as in Example 1.
[Characteristics Evaluation]
Characteristics evaluation of the capacitor prepared was carried out under an environment of 25° C. Charging was carried out up to 4.0 V at a current value of 1 C, and then constant current and constant voltage charging was carried out for 2 hours, where a constant voltage of 4.0 V was applied. Subsequently, it was discharged down to 2.0 V at a current value of 1 C. Next, the same charging as above was carried out for 2 hours, and then discharged down to 2.0 V at a current value of 300 C. Ratio of discharge capacitance at 300 C relative to discharge capacitance at 1 C was 82%. Next, characteristics evaluation was carried out under an environment of −20° C. Charging similar to the above was carried out, and discharged down to 2.0 V at a current value of 200 C. Ratio of discharge capacitance at −20° C. at 200 C relative to discharge capacitance at 25° C. at 1 C was 55%.

A durability test was further carried out similarly as in Example 1, and as a result, capacitance retention rate after 100,000 cycles elapsed was 60%.
[Nail Penetration Test]
A nail penetration test was carried out by a similar method as in Example 1. Results obtained are shown in following Table 1.

TABLE 1

|  | Example 1 | Example 2 | Example 3 | Comparative Example 1 |
| --- | --- | --- | --- | --- |
| Polymer type | PE Mv250000 (50 wt %) PE Mv700000 (50 wt %) | PE Mv250000 (50 wt %) PE Mv700000 (50 wt %) | PE Mv250000 (50 wt %) PE Mv700000 (50 wt %) | PE Mv250000 (50 wt %) PE Mv700000 (50 wt %) |
| Thickness of polyolefin resin porous membrane (μm) | 16 | 16 | 16 | 16 |
| Insulating substance | Alumina | Titania | Alumina | None |
| Thickness of insulating porous layer (μm) | 5 | 5 | 5 | None |
| Thermal shrinkage at 100° C., 1 hour (%) MD/TD | 1/1 | 2/1 | 1/1 | 7/4 |
| Total membrane thickness (μm) | 21 | 21 | 21 | 16 |
| Porosity of polyolefin porous membrane (%) | 65 | 65 | 41 | 65 |
| Pore size of polyolefin porous membrane (μm) | 0.05 | 0.05 | 0.085 | 0.05 |

TABLE 1-continued

|  | Example 1 | Example 2 | Example 3 | Comparative Example 1 |
|---|---|---|---|---|
| Number of pores of polyolefin porous membrane (pores/$\mu m^2$) | 190 | 190 | 40 | 190 |
| Brugmann index | 3.0 | 3.0 | 4.3 | 2.6 |
| Piercing strength (g) | 400 | 400 | 400 | 420 |
| Air permeability (sec/100 cc) | 95 | 100 | 255 | 180 |
| Ratio of output at (25° C., 300 C) relative to (25° C., 1 C) (%) | 78 | 79 | 67 | 82 |
| Ratio of output at (−20° C., 200 C) relative to (25° C., 1 C) (%) | 49 | 48 | 28 | 55 |
| Nail penetration test results |  |  |  |  |
| 1) Maximum laminate surface temperature | 1) 49° C. | 1) 50° C. | 1) 50° C. | 1) 122° C. |
| 2) Gas and smoke amount | 2) None | 2) None | 2) None | 2) significant generation |
| 3) Unsealed state | 3) Not unsealed | 3) Not unsealed | 3) Not unsealed | 3) unsealed |
| Capacitance retention rate after 100000 cycles (%) | 88 | 86 | 87 | 60 |

Example 4

[Preparation of Positive Electrode Body]

It was prepared similarly as in Example 1.

[Preparation of Negative Electrode Body]

It was prepared similarly as in Example 1.

[Preparation of Separator]

Separator 1 was used. Evaluation results of various characteristics of the separator 1 are shown in following Table 2.

[Preparation of Electrolytic Solution]

It was prepared similarly as in Example 1.

[Assembly of Capacitor]

The resulting one-side positive electrode body, both-sides positive electrode body and both-sides negative electrode body were cut into 100 mm×100 mm. Next, using the one-side positive electrode bodies at the uppermost surface and the undermost surface, and at the intermediate part, by laminating 20 sheets of the both-sides negative electrode body and 19 sheets of the both-sides positive electrode body, alternately through the separator, so that the insulating porous membrane of the separator 1 and the negative electrode body contact, and then by connecting the electrode terminals to the negative electrode body and the positive electrode body, an electrode laminate was obtained. This electrode laminate was inserted into a casing consisting of a laminate film, and the above-described electrolytic solution was injected in a state that the end parts of the electrode terminals were pulled out, to seal the casing and thus a lithium ion capacitor was assembled.

[Characteristics Evaluation]

Characteristics evaluation of the capacitor prepared was carried out under an environment of 25° C. Charging was carried out up to 4.0 V at a current value of 1 C, and then constant current and constant voltage charging was carried out for 2 hours, where a constant voltage of 4.0 V was applied. Subsequently, it was discharged down to 2.0 V under a current value of 1 C. Next, the same charging as above was carried out for 2 hours, and then discharged down to 2.0 V under a current value of 300 C. Ratio of discharge capacitance under 300 C relative to discharge capacitance under 1 C was 78%. Next, characteristics evaluation was carried out under an environment of −20° C. Charging similar to the above was carried out, and discharged down to 2.0 V at a current value of 200 C. Ratio of discharge capacitance at −20° C. at 200 C relative to discharge capacitance at 25° C. at 1 C was 49%.

A durability test was further carried out similarly as in Example 1, and as a result, capacitance retention rate after 100,000 cycles elapsed was 88%.

[Nail Penetration Test]

A nail penetration test was carried out by a similar method as in Example 1. Results obtained are shown in following Table 2.

Comparative Example 2

[Preparation of Positive Electrode Body]

It was prepared similarly as in Example 1.

[Preparation of Negative Electrode Body]

It was prepared similarly as in Example 1.

[Preparation of Separator]

Separator 1 was used. Evaluation results of various characteristics of the separator 1 are shown in following Table 2.

[Preparation of Electrolytic Solution]

It was prepared similarly as in Example 1.

[Assembly of Capacitor]

The resulting one-side positive electrode body, both-sides positive electrode body and both-sides negative electrode body were cut into 100 mm×100 mm. Next, using the one-side positive electrode bodies at the uppermost surface and the undermost surface, and at the intermediate part, by laminating 20 sheets of the both-sides negative electrode body and 19 sheets of the both-sides positive electrode body, alternately through the separator, so that the insulating porous membrane of the separator 1 and the positive electrode body contact, and then by connecting the electrode terminals to the negative electrode body and the positive electrode body, an electrode laminate was obtained. This electrode laminate was inserted into a casing consisting of a laminate film, and the above-described electrolytic solution was injected in a state that the end parts of the electrode terminals was pulled out, to seal the casing and thus a lithium ion capacitor was assembled.

[Characteristics Evaluation]

Characteristics evaluation of the capacitor prepared was carried out under an environment of 25° C. Charging was carried out up to 4.0 V at a current value of 1 C, and then constant current and constant voltage charging was carried out for 2 hours, where a constant voltage of 4.0 V was applied. Subsequently, it was discharged down to 2.0 V at a current value of 1 C. Next, the same charging as above was carried out for 2 hours, and then discharged down to 2.0 V at a current value of 300 C. Ratio of discharge capacitance at 300 C relative to discharge capacitance under 1 C was 72%. Next, characteristics evaluation was carried out under an environment of −20° C. Charging similar to the above was carried out, and discharged down to 2.0 V at a current value of 200 C. Ratio of discharge capacitance at −20° C. at 200 C relative to discharge capacitance at 25° C. at 1 C was 42%.

A durability test was further carried out similarly as in Example 1, and as a result, capacitance retention rate after 100,000 cycles elapsed was 84%.

[Nail Penetration Test]

A nail penetration test was carried out by a similar method as in Example 1. Results obtained are shown in following Table 2.

Comparative Example 3

[Preparation of Positive Electrode Body]

It was prepared similarly as in Example 1.

[Preparation of Negative Electrode Body]

It was prepared similarly as in Example 1.

[Preparation of Separator]

Separator 5 was obtained by preparing the insulating porous membrane also to a further one-side in the separator 1, using a similar method. Evaluation results of various characteristics of the separator 5 are shown in following Table 2.

[Preparation of Electrolytic Solution]

It was prepared similarly as in Example 1.

[Assembly of Capacitor]

The resulting one-side positive electrode body, both-sides positive electrode body and both-sides negative electrode body were cut into 100 mm×100 mm. Next, using the one-side positive electrode bodies at the uppermost surface and the undermost surface, and at the intermediate part, by laminating 20 sheets of the both-sides negative electrode body and 19 sheets of the both-sides positive electrode body, alternately through the separator, and then by connecting the electrode terminals to the negative electrode body and the positive electrode body, an electrode laminate was obtained. This electrode laminate was inserted into a casing consisting of a laminate film, and the above-described electrolytic solution was injected in a state that the end parts of the electrode terminals were pulled out, to seal the casing and thus a lithium ion capacitor was assembled.

[Characteristics Evaluation]

Characteristics evaluation of the capacitor prepared was carried out under an environment of 25° C. Charging was carried out up to 4.0 V at a current value of 1 C, and then constant current and constant voltage charging was carried out for 2 hours, where a constant voltage of 4.0 V was applied. Subsequently, it was discharged down to 2.0 V at a current value of 1 C. Next, the same charging as above was carried out for 2 hours, and then discharged down to 2.0 V at a current value of 300 C. Ratio of discharge capacitance at 300 C relative to discharge capacitance at 1 C was 59%. Next, characteristics evaluation was carried out under an environment of −20° C. Charging similar to the above was carried out, and discharged down to 2.0 V at a current value of 200 C. Ratio of discharge capacitance at −20° C. at 200 C relative to discharge capacitance at 25° C. at 1 C was 11%.

A durability test was further carried out similarly as in Example 1, and as a result, capacitance retention rate after 100,000 cycles elapsed was 89%.

[Nail Penetration Test]

A nail penetration test was carried out by a similar method as in Example 1. Results obtained are shown in Table 2.

TABLE 2

|  | Example 4 | Comparative Example 2 | Comparative Example 3 |
|---|---|---|---|
| Polymer type | PE Mv250000 (50 wt %) PE Mv700000 (50 wt %) | PE Mv250000 (50 wt %) PE Mv700000 (50 wt %) | PE Mv250000 (50 wt %) PE Mv700000 (50 wt %) |
| Thickness of polyolefin resin porous membrane (μm) | 16 | 16 | 16 |
| Insulating substance | Alumina | Alumina | Alumina |
| Thickness of insulating porous layer (μm) | 5 | 5 | 5 × 2 (coated onto both-sides) |
| Thermal shrinkage at 100° C., 1 hour (%) MD/TD | 1/1 | 1/1 | 1/1 |
| Total membrane thickness (μm) | 21 | 21 | 26 |
| Porosity of polyolefin porous membrane (%) | 65 | 65 | 65 |
| Pore size of polyolefin porous membrane (μm) | 0.05 | 0.05 | 0.05 |
| Number of pores of polyolefin porous membrane (pores/μm$^2$) | 190 | 190 | 190 |
| Brugmann index | 3.0 | 3.0 | 4.0 |
| Piercing strength (g) | 400 | 400 | 400 |
| Air permeability (sec/100 cc) | 95 | 95 | 110 |
| Electrode facing insulating layer | Negative electrode | Positive electrode | Both electrodes |
| Ratio of output at (25° C., 300 C) relative to (25° C., 1 C) (%) | 78 | 72 | 59 |
| Ratio of output at (−20° C., 200 C) relative to (25° C., 1 C) (%) | 49 | 42 | 11 |
| Nail penetration test results |  |  |  |
| 1) Maximum laminate surface temperature | 1) 49° C. | 1) 95° C. | 1) 48° C. |
| 2) Gas and smoke amount | 2) None | 2) Generated | 2) None |

TABLE 2-continued

|  | Example 4 | Comparative Example 2 | Comparative Example 3 |
|---|---|---|---|
| 3) Unsealed state Capacitance retention rate after 100000 cycles (%) | 3) Not unsealed 88 | 3) Unsealed 84 | 3) Not unsealed 89 |

Example 5

[Preparation of Positive Electrode Body]
It was prepared similarly as in Example 1.
[Preparation of Negative Electrode Body]
It was prepared similarly as in Example 1.
[Preparation of Separator]
Separator 6 was obtained, which was prepared using a similar method as in the separator 1, except for setting thickness of the insulating porous membrane at 2.5 μm. Evaluation results of various characteristics of the separator 6 are shown in following Table 3.
[Preparation of Electrolytic Solution]
It was prepared similarly as in Example 1.
[Assembly of Capacitor]
A lithium ion capacitor was assembled similarly as in Example 1.
[Characteristics Evaluation]
Characteristics evaluation of the capacitor prepared was carried out under an environment of 25° C. Charging was carried out up to 4.0 V at a current value of 1 C, and then constant current and constant voltage charging was carried out for 2 hours, where a constant voltage of 4.0 V was applied. Subsequently, it was discharged down to 2.0 V at a current value of 1 C. Next, the same charging as above was carried out for 2 hours, and then discharged down to 2.0 V at a current value of 300 C. Ratio of discharge capacitance at 300 C relative to discharge capacitance at 1 C was 81%. Next, characteristics evaluation was carried out under an environment of −20° C. Charging similar to the above was carried out, and discharged down to 2.0 V at a current value of 200 C. Ratio of discharge capacitance at −20° C. at 200 C relative to discharge capacitance at 25° C. at 1 C was 51%.
A durability test was further carried out similarly as in Example 1, and as a result, capacitance retention rate after 100,000 cycles elapsed was 69%.
[Nail Penetration Test]
A nail penetration test was carried out by a similar method as in Example 1. Results obtained are shown in following Table 3.

Example 6

[Preparation of Positive Electrode Body]
It was prepared similarly as in Example 1.
[Preparation of Negative Electrode Body]
It was prepared similarly as in Example 1.
[Preparation of Separator]
Separator 7 was obtained, which was prepared using a similar method as in the separator 1, except for setting thickness of the insulating porous membrane at 10 μm. Evaluation results of various characteristics of the separator 7 are shown in following Table 3.
[Preparation of an Electrolytic Solution]
It was prepared similarly as in Example 1.
[Assembly of Capacitor]
A lithium ion capacitor was assembled similarly as in Example 4.
[Characteristics Evaluation]
Characteristics evaluation of the capacitor prepared was carried out under an environment of 25° C. Charging was carried out up to 4.0 V at a current value of 1 C, and then constant current and constant voltage charging was carried out for 2 hours, where a constant voltage of 4.0 V was applied. Subsequently, it was discharged down to 2.0 V at a current value of 1 C. Next, the same charging as above was carried out for 2 hours, and then discharged down to 2.0 V at a current value of 300 C. Ratio of discharge capacitance at 300 C relative to discharge capacitance at 1 C was 72%. Next, characteristics evaluation was carried out under an environment of −20° C. Charging similar to the above was carried out, and discharged down to 2.0 V at a current value of 200 C. Ratio of discharge capacitance at −20° C. at 200 C relative to discharge capacitance at 25° C. at 1 C was 35%.
A durability test was further carried out similarly as in Example 1, and as a result, capacitance retention rate after 100,000 cycles elapsed was 90%.
[Nail Penetration Test]
A nail penetration test was carried out by a similar method as in Example 1. Results obtained are shown in following Table 3.

Example 7

[Preparation of Positive Electrode Body]
It was prepared similarly as in Example 1.
[Preparation of Negative Electrode Body]
It was prepared similarly as in Example 1.
[Preparation of Separator]
Separator 8 was obtained, which was prepared using a similar method as in the separator 1, except for setting thickness of the insulating porous membrane at 16 μm. Evaluation results of various characteristics of the separator 8 are shown in following Table 3.
[Preparation of Electrolytic Solution]
It was prepared similarly as in Example 1.
[Assembly of Capacitor]
A lithium ion capacitor was assembled similarly as in Example 4.
[Characteristics Evaluation]
Characteristics evaluation of the capacitor prepared was carried out under an environment of 25° C. Charging was carried out up to 4.0 V at a current value of 1 C, and then constant current and constant voltage charging was carried out for 2 hours, where a constant voltage of 4.0 V was applied. Subsequently, it was discharged down to 2.0 V at a current value of 1 C. Next, the same charging as above was carried out for 2 hours, and then discharged down to 2.0 V at a current value of 300 C. Ratio of discharge capacitance at 300 C relative to discharge capacitance at 1 C was 68%. Next, characteristics evaluation was carried out under an environment of −20° C. Charging similar to the above was carried out, and discharged down to 2.0 V at a current value of 200 C. Ratio of discharge capacitance at −20° C. at 200 C relative to discharge capacitance at 25° C. at 1 C was 29%.

A durability test was further carried out similarly as in Example 1, and as a result, capacitance retention rate after 100,000 cycles elapsed was 90%.

[Nail Penetration Test]

A nail penetration test was carried out by a similar method as in Example 1. Results obtained are shown in following Table 3.

Example 8

[Preparation of Positive Electrode Body]
It was prepared similarly as in Example 1.
[Preparation of Negative Electrode Body]
It was prepared similarly as in Example 1.
[Preparation of Separator]

Separator 9 was obtained, which was prepared using a similar method as in the separator 1, except for setting thickness of the insulating porous membrane at 21 μm.

Evaluation results of various characteristics of the separator 9 are shown in following Table 3.

[Preparation of Electrolytic Solution]
It was prepared similarly as in Example 1.

[Assembly of Capacitor]
A lithium ion capacitor was assembled similarly as in Example 4.
[Characteristics Evaluation]

Characteristics evaluation of the capacitor prepared was carried out under an environment of 25° C. Charging was carried out up to 4.0 V at a current value of 1 C, and then constant current and constant voltage charging was carried out for 2 hours, where a constant voltage of 4.0 V was applied. Subsequently, it was discharged down to 2.0 V at a current value of 1 C. Next, the same charging as above was carried out for 2 hours, and then discharged down to 2.0 V at a current value of 300 C. Ratio of discharge capacitance at 300 C relative to discharge capacitance at 1 C was 58%.

Next, characteristics evaluation was carried out under an environment of −20° C. Charging similar to the above was carried out, and discharged down to 2.0 V at a current value of 200 C. Ratio of discharge capacitance at −20° C. at 200 C relative to discharge capacitance at 25° C. at 1 C was 7%.

A durability test was further carried out similarly as in Example 1, and as a result, capacitance retention rate after 100,000 cycles elapsed was 86%.

[Nail Penetration Test]

A nail penetration test was carried out by a similar method as in Example 1. Results obtained are shown in following Table 3.

TABLE 3

|  | Example 4 | Example 5 | Example 6 | Example 7 | Example 8 |
| --- | --- | --- | --- | --- | --- |
| Polymer type | PE Mv250000 (50 wt %) PE Mv700000 (50 wt %) | PE Mv250000 (50 wt %) PE Mv700000 (50 wt %) | PE Mv250000 (50 wt %) PE Mv700000 (50 wt %) | PE Mv250000 (50 wt %) PE Mv700000 (50 wt %) | PE Mv250000 (50 wt %) PE Mv700000 (50 wt %) |
| Thickness of polyolefin resin porous membrane (μm) | 16 | 16 | 16 | 16 | 16 |
| Insulating substance | Alumina | Alumina | Alumina | Alumina | Alumina |
| Thickness of insulating porous layer (μm) | 5 | 2.5 | 10 | 16 | 21 |
| Thermal shrinkage at 100° C., 1 hour (%) MD/TD | 1/1 | 6/3 | 0.5/0.5 | 0.5/0.5 | 0.5/0.5 |
| Total membrane thickness (μm) | 21 | 18.5 | 26 | 36 | 37 |
| Porosity of polyolefin porous membrane (%) | 65 | 65 | 65 | 65 | 65 |
| Pore size of polyolefin porous membrane (μm) | 0.05 | 0.05 | 0.05 | 0.05 | 0.05 |
| Number of pores of polyolefin porous membrane (pores/μm$^2$) | 190 | 190 | 190 | 190 | 190 |
| Brugmann index | 3.0 | 3.0 | 3.2 | 3.5 | 4.0 |
| Piercing strength (g) | 400 | 400 | 400 | 410 | 420 |
| Air permeability (sec/100 cc) | 95 | 90 | 100 | 120 | 130 |
| Electrode facing insulating layer | Negative electrode | Negative electrode | Negative electrode | Negative electrode | Negative electrode |
| Ratio of output at (25° C., 300 C) relative to (25° C., 1 C) (%) | 78 | 81 | 72 | 68 | 58 |
| Ratio of output at (−20° C., 200 C) relative to (25° C., 1 C) (%) | 49 | 51 | 35 | 29 | 7 |
| Nail penetration test results |  |  |  |  |  |
| 1) Maximum laminate surface temperature | 1) 49° C. | 1) 80° C. | 1) 45° C. | 1) 41° C. | 1) 38° C. |
| 2) Gas and smoke amount | 2) None | 2) Generated | 2) None | 2) None | 2) None |
| 3) Unsealed state | 3) Not unsealed | 3) Unsealed | 3) Not unsealed | 3) Not unsealed | 3) Not unsealed |
| Capacitance retention rate after 100000 cycles (%) | 88 | 69 | 90 | 90 | 86 |

Example 9

[Preparation of Positive Electrode Body]
It was prepared similarly as in Example 1.
[Preparation of Negative Electrode Body]
It was prepared similarly as in Example 1.
[Preparation of Separator]
Separator 10 was obtained, which was prepared using a similar method as in the separator 1, except for setting thickness of the polyolefin porous membrane at 4 µm. Evaluation results of various characteristics of the separator 10 are shown in following Table 4.
[Preparation of Electrolytic Solution]
It was prepared similarly as in Example 1.
[Assembly of Capacitor]
A lithium ion capacitor was assembled similarly as in Example 4.
[Characteristics Evaluation]
Characteristics evaluation of the capacitor prepared was carried out under an environment of 25° C. Charging was carried out up to 4.0 V at a current value of 1 C, and then constant current and constant voltage charging was carried out for 2 hours, where a constant voltage of 4.0 V was applied. Subsequently, it was discharged down to 2.0 V at a current value of 1 C. Next, the same charging as above was carried out for 2 hours, and then discharged down to 2.0 V at a current value of 300 C. Ratio of discharge capacitance at 300 C relative to discharge capacitance at 1 C was 60%. Next, characteristics evaluation was carried out under an environment of –20° C.
Charging similar to the above was carried out, and discharged down to 2.0 V at a current value of 200 C. Ratio of discharge capacitance at –20° C. at 200 C relative to discharge capacitance at 25° C. at 1 C was 31%.
A durability test was further carried out similarly as in Example 1, and as a result, capacitance retention rate after 100,000 cycles elapsed was 68%.
[Nail Penetration Test]
A nail penetration test was carried out by a similar method as in Example 1. Results obtained are shown in following Table 4.

Example 10

[Preparation of Positive Electrode Body]
It was prepared similarly as in Example 1.
[Preparation of Negative Electrode Body]
It was prepared similarly as in Example 1.
[Preparation of Separator]
Separator 11 was obtained, which was prepared using a similar method as in the separator 1, except for setting thickness of the polyolefin porous membrane at 20 µm. Evaluation results of various characteristics of the separator 11 are shown in following Table 4.
[Preparation of Electrolytic Solution]
It was prepared similarly as in Example 1.
[Assembly of Capacitor]
A lithium ion capacitor was assembled similarly as in Example 4.
[Characteristics Evaluation]
Characteristics evaluation of the capacitor prepared was carried out under an environment of 25° C. Charging was carried out up to 4.0 V at a current value of 1 C, and then constant current and constant voltage charging was carried out for 2 hours, where a constant voltage of 4.0 V was applied. Subsequently, it was discharged down to 2.0 V at a current value of 1 C. Next, the same charging as above was carried out for 2 hours, and then discharged down to 2.0 V at a current value of 300 C. Ratio of discharge capacitance at 300 C relative to discharge capacitance at 1 C was 71%. Next, characteristics evaluation was carried out under an environment of –20° C. Charging similar to the above was carried out, and discharged down to 2.0 V at a current value of 200 C. Ratio of discharge capacitance at –20° C. at 200 C relative to discharge capacitance at 25° C. at 1 C was 35%.
A durability test was further carried out similarly as in Example 1, and as a result, capacitance retention rate after 100,000 cycles elapsed was 86%.
[Nail Penetration Test]
A nail penetration test was carried out by a similar method as in Example 1. Results obtained are shown in following Table 4.

Example 11

[Preparation of Positive Electrode Body]
It was prepared similarly as in Example 1.
[Preparation of Negative Electrode Body]
It was prepared similarly as in Example 1.
[Preparation of Separator]
Separator 12 was obtained, which was prepared using a similar method as in the separator 1, except for setting thickness of the polyolefin porous membrane at 30 µm. Evaluation results of various characteristics of the separator 12 are shown in following Table 4.
[Preparation of Electrolytic Solution]
It was prepared similarly as in Example 1.
[Assembly of Capacitor]
A lithium ion capacitor was assembled similarly as in Example 4.
[Characteristics Evaluation]
Characteristics evaluation of the capacitor prepared was carried out under an environment of 25° C. Charging was carried out up to 4.0 V at a current value of 1 C, and then constant current and constant voltage charging was carried out for 2 hours, where a constant voltage of 4.0 V was applied. Subsequently, it was discharged down to 2.0 V at a current value of 1 C. Next, the same charging as above was carried out for 2 hours, and then discharged down to 2.0 V at a current value of 300 C. Ratio of discharge capacitance at 300 C relative to discharge capacitance at 1 C was 68%. Next, characteristics evaluation was carried out under an environment of –20° C. Charging similar to the above was carried out, and discharged down to 2.0 V at a current value of 200 C. Ratio of discharge capacitance at –20° C. at 200 C relative to discharge capacitance at 25° C. at 1 C was 27%.
A durability test was further carried out similarly as in Example 1, and as a result, capacitance retention rate after 100,000 cycles elapsed was 84%.
[Nail Penetration Test]
A nail penetration test was carried out by a similar method as in Example 1. Results obtained are shown in following Table 4.

Example 12

[Preparation of Positive Electrode Body]
It was prepared similarly as in Example 1.
[Preparation of Negative Electrode Body]
It was prepared similarly as in Example 1.
[Preparation of Separator]
Separator 13 was obtained, which was prepared using a similar method as in the separator 1, except for setting thickness of the polyolefin porous membrane at 37 μm. Evaluation results of various characteristics of the separator 13 are shown in Table 4.

[Preparation of Electrolytic Solution]

It was prepared similarly as in Example 1.

[Assembly of Capacitor]

A lithium ion capacitor was assembled similarly as in Example 4.

[Characteristics Evaluation]

Characteristics evaluation of the capacitor prepared was carried out under an environment of 25° C. Charging was carried out up to 4.0 V at a current value of 1 C, and then constant current and constant voltage charging was carried out for 2 hours, where a constant voltage of 4.0 V was applied. Subsequently, it was discharged down to 2.0 V at a current value of 1 C. Next, the same charging as above was carried out for 2 hours, and then discharged down to 2.0 V at a current value of 300 C. Ratio of discharge capacitance at 300 C relative to discharge capacitance at 1 C was 51%. Next, characteristics evaluation was carried out under an environment of −20° C. Charging similar to the above was carried out, and discharged down to 2.0 V at a current value of 200 C. Ratio of discharge capacitance at −20° C. at 200 C relative to discharge capacitance at 25° C. at 1 C was 10%.

A durability test was further carried out similarly as in Example 1, and as a result, capacitance retention rate after 100,000 cycles elapsed was 69%.

[Nail Penetration Test]

A nail penetration test was carried out by a similar method as in Example 1. Results obtained are shown in following Table 4.

Example 13

[Preparation of Positive Electrode Body]

A phenolic resin was subjected to carbonization treatment under nitrogen atmosphere at 600° C. for 2 hours. After that, the calcined material was pulverized using a ball mill and classified to obtain a carbonized product having an average particle diameter of 7 μm.

This carbonized product and KOH were mixed in a weight ratio of 1:5, and the mixture was heated in a furnace under nitrogen atmosphere at 800° C. for 1 hour for activation. After that, it was washed under stirring for 1 hour using diluted hydrochloric acid, which was adjusted to 2 mole/L, then washed by boiling with distilled water till pH thereof stabilizes between 5 to 6, and then dried to prepare an activated carbon 2.

Pore distribution of the activated carbon 2 was determined by the above method, using a micro-pore distribution measurement apparatus (AUTOSORB-1 AS-1-MP), manufactured by Yuasa Ionics Co., Ltd., and BET specific surface area was determined by a BET one point method. As a result, the mesopore volume V1 was 1.50 cc/g, the micro-pore volume V2 was 2.28 cc/g, and BET specific surface area was 3627 $m^2$/g.

By using this activated carbon 2 as the positive active material, a slurry-like active material layer was obtained by mixing 83.4 parts by mass of the activated carbon, 8.3 parts by mass of electric conductive carbon black (Ketjen black ECP600JD, manufactured by Lion Corporation) and 8.3 parts by mass of PVDF (polyvinylidene fluoride, KF polymer, W#9300, manufactured by Kureha Corporation; melting point: 163° C.) with NMP (N-methylpyrrolidone). Next,

TABLE 4

|  | Example 4 | Example 9 | Example 10 | Example 11 | Example 12 |
| --- | --- | --- | --- | --- | --- |
| Polymer type | PE Mv250000 (50 wt %) PE Mv700000 (50 wt %) | PE Mv250000 (50 wt %) PE Mv700000 (50 wt %) | PE Mv250000 (50 wt %) PE Mv700000 (50 wt %) | PE Mv250000 (50 wt %) PE Mv700000 (50 wt %) | PE Mv250000 (50 wt %) PE Mv700000 (50 wt %) |
| Thickness of polyolefin resin porous membrane (μm) | 16 | 4 | 20 | 30 | 37 |
| Insulating substance | Alumina | Alumina | Alumina | Alumina | Alumina |
| Thickness of insulating porous layer (μm) | 5 | 5 | 5 | 5 | 5 |
| Thermal shrinkage at 100° C., 1 hour (%) MD/TD | 1/1 | 0/0 | 3/2 | 5/5 | 6/4 |
| Total membrane thickness (μm) | 21 | 9 | 25 | 35 | 42 |
| Porosity of polyolefin porous membrane (%) | 65 | 65 | 70 | 65 | 65 |
| Pore size of polyolefin porous membrane (μm) | 0.05 | 0.05 | 0.05 | 0.05 | 0.05 |
| Number of pores of polyolefin porous membrane (pieces/$μm^2$) | 190 | 80 | 200 | 190 | 190 |
| Brugmann index | 3.0 | 3.8 | 3.2 | 3.5 | 4.0 |
| Piercing strength (g) | 400 | 150 | 500 | 750 | 900 |
| Air permeability (sec/100 cc) | 95 | 45 | 120 | 170 | 220 |
| Electrode facing insulating layer | Negative electrode | Negative electrode | Negative electrode | Negative electrode | Negative electrode |
| Ratio of output at (25° C., 300 C) relative to (25° C., 1 C) (%) | 78 | 60 | 71 | 68 | 51 |
| Ratio of output at (−20° C., 200 C) relative to (25° C., 1 C) (%) | 49 | 31 | 35 | 27 | 10 |
| Nail penetration test results |  |  |  |  |  |
| 1) Maximum laminate surface temperature | 1) 49° C. | 1) 50° C. | 1) 48° C. | 1) 59° C. | 1) 83° C. |
| 2) Gas and smoke amount | 2) None | 2) None | 2) None | 2) Small amount generation | 2) Generated |
| 3) Unsealed state | 3) Not unsealed | 3) Not unsealed | 3) Not unsealed | 3) Not unsealed | 3) Unsealed |
| Capacitance retention rate after 100000 cycles (%) | 88 | 68 | 86 | 84 | 69 | the resulting active material layer was coated onto one-side or both-sides of an aluminum foil having a thickness of 15 µm, and dried. The bulk density of the electrode active material layer was 0.28 g/cm$^3$. The bulk density of the electrode active material layer was calculated and determined by sufficiently drying an electrode, in a dry room managed to have a dew point of −60° C. or lower, and determining weight of the electrode excluding the collector, and thickness of the electrode active material layer excluding thickness of the collector. As for measurement of the thickness, DG-4120, manufactured by Ono Sokki Co., Ltd. was used.

The electrode coated with the active material layer was laid at feed roll position of FIG. 1, and pressurized under condition of a line pressure of 110 kgf/cm, a roll gap of 60 µm at the first time, and 30 µm at the second time, using a heating press roll apparatus (MSC-31, manufactured by Yuri Roll Machine Co., Ltd.) heated at 140° C. to obtain a positive electrode having the bulk density of the electrode active material layer of 0.46 g/cm$^3$, and a thickness of the one-side of the positive electrode active material layer of 67 µm. Press was carried out at a speed of 5 m/min. As for a measurement method for temperature of the heating roll, roll surface temperature was detected in a contactless manner, using an infrared radiation thermometer, IT2-60, manufactured by KEYENCE Co., Ltd., and the temperature was adjusted at setting temperature by PID control. Line pressure was calculated from pressure applied on the pressurization roll, and contact length of the upper and the lower rolls.

[Preparation of Negative Electrode Body]

Pore distribution of a commercial coconut shell activated carbon was measured using nitrogen as an adsorbate, and using a fine pore distribution measuring apparatus (AUTOSORB-1 AS-1-MP), manufactured by Yuasa Ionics Co., Ltd. Specific surface area was determined by BET one point method. The mesopore volume and the micro-pore volume were determined by the BJH method and the MP method, respectively, as mentioned above, using an isotherm at the desorption side. As a result, BET specific surface area was 1,780 m$^2$/g, the mesopore volume (V1) was 0.198 cc/g, the micro-pore volume (V2) was 0.695 cc/g, V1/V2=0.29, and average pore size was 21.2 Å. 150 g of this activated carbon was put in a cage made of a stainless steel mesh, and it was laid on a stainless steel bat containing 150 g of coal-based pitch (softening point: 90° C.), and it was then laid in an electric furnace (usable inside dimension of the furnace: 300 mm×300 mm×300 mm), to carry out a thermal reaction. Heat treatment was carried out under nitrogen atmosphere, and by increasing temperature up to 630° C. taking 2 hours, maintaining at the same temperature for 4 hours, and subsequently cooling down to 60° C. by natural cooling, it was then taken out of the furnace to obtain a composite porous material 2 as a negative electrode material.

As for the composite porous material 2, the deposited carbonaceous material had a weight ratio of 38%, relative to the activated carbon, and BET specific surface area was 434 m$^2$/g, the mesopore volume (Vm1) was 0.220 cc/g, the micro-pore volume (Vm2) was 0.149 cc/g. Measurement result of average particle size, using a laser diffraction particle size distribution analyzer (SALD-2000J), manufactured by Shimadzu Corp., was 2.88 µm.

Then, slurry was obtained by mixing 83.4 parts by mass of the composite porous material 2 obtained above, 8.3 parts by mass of acetylene black, 8.3 parts by mass of PVDF (polyfluorovinilidene), and NMP (N-methylpyrrolidone). The resulting slurry was then coated onto both-sides of an expanded copper foil, dried and pressed to obtain a negative electrode having a thickness of the negative active substance layer of 32 µm.

In a three electrode-type cell, where the negative electrode obtained above was cut out in an area of 3 cm$^2$, to be used as a working electrode, and lithium was used as a counter electrode and reference electrode, and the solution in which LiPF$_6$ was dissolved at a concentration of 1 mol/L into a mixed solvent of ethylene carbonate and methyl ethyl carbonate in a volume ratio of 1:4, was used as an electrolytic solution;

when initial time lithium charging amount is defined by charging amount, after 40 hours in total in constant current and constant voltage charging, by charging lithium at constant current, under condition of current value to attain a value of 100 mA/g per the negative electrode active material, and a cell temperature of 45° C., and further charging by switching to constant voltage, when negative electrode potential reaches 1 mV; and initial time lithium discharging amount is defined by discharging amount in discharging lithium till negative electrode potential reaches to 2.5 V at constant current, under condition that current value to attain a value of 50 mA/g per the negative electrode active material, and a cell temperature of 45° C., after the above-described charging;

the initial time lithium charging amount was 1510 mAh/g; and discharging amount, under a negative electrode potential of 0 to 0.5 V, was 165 mAh/g, in the initial time lithium discharging amount.

Further, a lithium metal foil, equivalent to 1460 mAh/g per unit weight of the composite porous material 2, was pasted to one-side of the both-side negative electrode body.

[Preparation of Separator]

Separator 1 was used.

[Preparation of Electrolytic Solution]

It was prepared similarly as in Example 1.

[Assembly of Capacitor]

A lithium ion capacitor was assembled similarly as in Example 4.

[Characteristics Evaluation]

Characteristics evaluation of the capacitor prepared was carried out under an environment of 25° C. Charging was carried out up to 4.0 V at a current value of 1 C, and then constant current and constant voltage charging was carried out for 2 hours, where a constant voltage of 4.0 V was applied. Subsequently, it was discharged down to 2.0 V at a current value of 1 C. Next, the same charging as above was carried out for 2 hours, and then discharged down to 2.0 V at a current value of 300 C. Ratio of discharge capacitance at 300 C relative to discharge capacitance at 1 C was 85%. Next, characteristics evaluation was carried out under an environment of −20° C. Charging similar to the above was carried out, and discharged down to 2.0 V at a current value of 200 C. Ratio of discharge capacitance at −20° C. at 200 C relative to discharge capacitance at 25° C. at 1 C was 61%.

A durability test was further carried out similarly as in Example 1, and as a result, capacitance retention rate after 100,000 cycles elapsed was 89%.

[Nail Penetration Test]

A nail penetration test was carried out by a similar method as in Example 1. Maximum temperature at the laminate surface was 50° C., there was no generation of gas or smoke, and there was no unsealing of the laminate.

INDUSTRIAL APPLICABILITY

The lithium ion capacitor of the present invention is suitably utilizable as an electrical storage element for a hybrid drive system, etc.

REFERENCE SIGNS LIST

1. Polyolefin porous membrane
2. Insulating porous membrane
3. Cell
4. Positive electrode terminal
5. Negative electrode terminal
6. Temperature measurement position
7. Temperature measurement position
8. Nail penetration position
9. Heat seal part
10. Feeding roll
11. Guide
12. Heating press roll
13. Winding roll
14. Hydraulic cylinder

The invention claimed is:

1. A lithium ion capacitor comprising an electrode laminated body stored in a casing together with a non-aqueous electrolytic solution containing a lithium ion-containing electrolyte; wherein
said electrode laminated body is laminated so that a negative electrode body having a negative electrode active material comprised of a carbon material, and a positive electrode body having a positive electrode active material face each other through a laminated separator where a polyolefin porous membrane and an insulating porous membrane are laminated,
wherein said carbon material of the negative electrode active material intercalates and deintercalates lithium ions, and said positive electrode active material is an activated carbon;
said insulating porous membrane is in contact with said negative electrode body; and
said insulating porous membrane of the laminated separator faces said negative electrode body, and does not face said positive electrode body.

2. The lithium ion capacitor according to claim 1, wherein said insulating porous membrane contains inorganic fillers and a resin binder.

3. The lithium ion capacitor according to claim 1, wherein the thickness of said polyolefin porous membrane of said laminated separator is 5 μm or more to 35 μm or less, and a thickness ratio of said insulating porous membrane relative to said polyolefin porous membrane (thickness of insulating porous membrane/thickness of polyolefin porous membrane) is 0.25 to 1.00.

4. The lithium ion capacitor according to claim 1, wherein a pore size of said polyolefin porous membrane is 0.01 μm to 0.1 μm, and a number of pores of said polyolefin porous membrane is 100 pores/μm$^2$ to 250 pores/μm$^2$.

5. The lithium ion capacitor according to claim 1, wherein a porosity of said polyolefin porous membrane is 50% to 75%.

6. The lithium ion capacitor according to claim 1, wherein said polyolefin porous membrane is comprised of polyethylene.

7. The lithium ion capacitor according to claim 1, wherein Brugmann index of said separator is 2.5 to 3.5, which is measured and calculated using methyl ethyl carbonate as a probe molecule.

8. The lithium ion capacitor according to claim 1, wherein static capacitance is 100 F or higher.

9. The lithium ion capacitor according to claim 1, wherein said negative electrode active material is a composite porous material formed by depositing pitch coal to the surface of an activated carbon.

10. The lithium ion capacitor according to claim 9, wherein said composite porous material satisfies at the same time, in the initial time lithium charge/discharge characteristic, the following:
1) a charging amount is 1100 mAh/g or more to 2000 mAh/g or less; and
2) a discharging amount is 100 mAh/g or higher, under a negative electrode potential of 0 to 0.5 V.

11. The lithium ion capacitor according to claim 1, wherein said negative electrode body excludes activated carbon.

12. The lithium ion capacitor according to claim 1, wherein, in said laminated separator, said insulating porous membrane is laminated on only one surface of said polyolefin porous membrane.

13. The lithium ion capacitor according to claim 1, wherein the polyolefin porous membrane faces said positive electrode body.

14. A lithium ion capacitor comprising an electrode laminated body stored in a casing together with a non-aqueous electrolytic solution containing a lithium ion-containing electrolyte; wherein
said electrode laminated body is laminated so that a negative electrode body having a negative electrode active material comprised of a carbon material, and a positive electrode body having a positive electrode active material face each other through a laminated separator where a polyolefin porous membrane and an insulating porous membrane are laminated,
wherein said carbon material of the negative electrode active material intercalates and deintercalates lithium ions, and said positive electrode active material is an activated carbon;
said insulating porous membrane is in contact with said negative electrode body; and
a pore size of said polyolefin porous membrane is 0.01 μm to 0.1 μm, and a number of pores of said polyolefin porous membrane is 100 pores/μm$^2$ to 250 pores/μm$^2$.

15. The lithium ion capacitor according to claim 14, wherein said insulating porous membrane contains inorganic fillers and a resin binder.

16. The lithium ion capacitor according to claim 14, wherein the thickness of said polyolefin porous membrane of said laminated separator is 5 μm or more to 35 μm or less, and a thickness ratio of said insulating porous membrane relative to said polyolefin porous membrane (thickness of insulating porous membrane/thickness of polyolefin porous membrane) is 0.25 to 1.00.

* * * * *